United States Patent
Sakurabu et al.

(10) Patent No.: US 11,277,570 B2
(45) Date of Patent: Mar. 15, 2022

(54) IMAGING ELEMENT, IMAGING APPARATUS, IMAGE DATA PROCESSING METHOD, AND PROGRAM

(71) Applicant: FUJIFILM CORPORATION, Tokyo (JP)

(72) Inventors: Hitoshi Sakurabu, Saitama (JP); Ryo Hasegawa, Saitama (JP); Tomoyuki Kawai, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/204,950

(22) Filed: Mar. 18, 2021

(65) Prior Publication Data

US 2021/0203831 A1 Jul. 1, 2021

Related U.S. Application Data

(63) Continuation of application No. PCT/JP2019/025650, filed on Jun. 27, 2019.

(30) Foreign Application Priority Data

Sep. 27, 2018 (JP) .............................. JP2018-181887

(51) Int. Cl.
*H04N 5/235* (2006.01)
*H04N 5/225* (2006.01)
*H04N 5/232* (2006.01)

(52) U.S. Cl.
CPC ......... *H04N 5/2357* (2013.01); *H04N 5/2252* (2013.01); *H04N 5/23254* (2013.01)

(58) Field of Classification Search
CPC ............... H04N 5/2357; H04N 5/2252; H04N 5/23254; H04N 5/3532; H04N 5/2351;
(Continued)

(56) References Cited

U.S. PATENT DOCUMENTS

2002/0158971 A1 10/2002 Daiku et al.
2012/0154629 A1 6/2012 Horiuchi
(Continued)

FOREIGN PATENT DOCUMENTS

| JP | 2002-330350 A | 11/2002 |
| JP | 2008-147713 A | 6/2008 |
| JP | 2012-134663 A | 7/2012 |
| JP | 2017-501627 A | 1/2017 |

(Continued)

OTHER PUBLICATIONS

International Search Report issued in International Application No. PCT/JP2019/025650 dated Sep. 17, 2019.
(Continued)

*Primary Examiner* — Timothy J Henn
(74) *Attorney, Agent, or Firm* — Solaris Intellectual Property Group, PLLC

(57) ABSTRACT

An imaging element incorporates a processing circuit and a memory. The memory stores captured image data obtained by imaging a subject at a first frame rate. The processing circuit performs processing based on the captured image data stored in the memory. An output circuit outputs output image data based on the captured image data to an outside of the imaging element at a second frame rate. The first frame rate is a frame rate higher than the second frame rate and is determined in accordance with an occurrence cycle of a flicker, and the processing circuit detects a flicker effect avoidance timing at which an effect of the flicker on imaging by the imaging element is avoided, based on the captured image data of a plurality of frames.

20 Claims, 20 Drawing Sheets

(58) Field of Classification Search
CPC .... H04N 5/23209; H04N 5/357; H04N 5/378; H04N 5/353
See application file for complete search history.

(56) References Cited

U.S. PATENT DOCUMENTS

| | | | | |
|---|---|---|---|---|
| 2015/0172529 A1* | 6/2015 | Aota | ................ | H04N 5/378 348/228.1 |
| 2016/0381319 A1* | 12/2016 | Nakajima | ............. | H04N 5/225 348/231.99 |
| 2019/0215434 A1* | 7/2019 | Suzuki | ................ | H04N 5/353 |
| 2019/0268525 A1* | 8/2019 | Okada | ............... | H04N 5/23293 |

FOREIGN PATENT DOCUMENTS

| | | |
|---|---|---|
| JP | 2017-108336 A | 6/2017 |
| JP | 2017-188760 A | 10/2017 |
| JP | 2018-007210 A | 1/2018 |
| JP | 2018-050346 A | 3/2018 |
| WO | 2015/163145 A1 | 10/2015 |
| WO | 2017/217137 A1 | 12/2017 |

OTHER PUBLICATIONS

Written Opinion of the ISA issued in International Application No. PCT/JP2019/025650 dated Sep. 17, 2019.
English language translation of the following: Office action dated Jun. 15, 2021 from the JPO in a Japanese patent application No. 2020-547996 corresponding to the instant patent application.

* cited by examiner

[IMAGING APPARATUS ACCORDING TO TECHNOLOGY IN RELATED ART]

[CHANGE IN VOLTAGE OF COMMERCIAL POWER SOURCE OF 50 Hz (60 Hz)]

[FLICKERING CHARACTERISTIC OF LIGHT SOURCE OF 100 Hz (120 Hz)]

[CASE OF SAMPLING FREQUENCY = 200 Hz]

[CASE OF SAMPLING FREQUENCY = 400 Hz]

[CASE OF SAMPLING FREQUENCY = 800 Hz]

[ORIGINAL LIGHT SOURCE FLICKERING CHARACTERISTIC]

[LIGHT SOURCE FLICKERING CHARACTERISTIC AFTER FEW HOURS]

IMAGING ELEMENT, IMAGING APPARATUS, IMAGE DATA PROCESSING METHOD, AND PROGRAM

CROSS-REFERENCE TO RELATED APPLICATIONS

This application is a continuation application of International Application No. PCT/JP2019/025650, filed Jun. 27, 2019, the disclosure of which is incorporated herein by reference in its entirety. Further, this application claims priority under 35 USC 119 from Japanese Patent Application No. 2018-181887 filed Sep. 27, 2018, the disclosure of which is incorporated by reference herein.

BACKGROUND

1. Technical Field

The technology of the present disclosure relates to an imaging element, an imaging apparatus, an image data processing method, and a program.

2. Related Art

JP2017-188760A discloses an image processing apparatus comprising a storage portion that stores a pixel signal output from an imaging element, a signal processing portion that performs signal processing on the pixel signal stored in the storage portion, and a wave detection portion that causes wave detection processing for the pixel signal in the same frame to be completed before completion of the signal processing by the signal processing portion.

JP2018-007210A discloses a signal processing apparatus comprising a brightness information calculation portion that calculates brightness information on a captured image, a brightness reference calculation portion that calculates a brightness reference value indicating brightness as a reference based on the brightness information at a plurality of times, and a correction parameter calculation portion that calculates a correction parameter for correcting brightness of the captured image based on the brightness information and the brightness reference value.

WO2015/163145A discloses an image processing apparatus comprising a strength ratio calculation portion that calculates a ratio related to strength of a signal value at a predetermined position in images captured under different exposure conditions, and a contribution degree calculation portion that calculates a contribution degree representing whether a strength ratio calculated by the strength ratio calculation portion originates from a periodic noise component or originates from a motion.

JP2017-501627A discloses an image sensor comprising an imaging region that includes a plurality of pixels, and one or more flicker detection region each including one or more pixels, in which at least one of the one or more pixels in at least one flicker detection region is sampled a plurality of times while at least one pixel in the imaging region captures an image.

For example, an imaging apparatus that performs imaging using a rolling shutter method together with an electronic shutter and a mechanical shutter is illustrated as an imaging apparatus to which the technologies disclosed in JP2017-188760A, JP2018-007210A, WO2015/163145A, and JP2017-501627A are applied. In this type of imaging apparatus, for example, in a photoelectric conversion element, exposure is sequentially started on one line at a time, and an electric charge signal corresponding to an exposure amount is read out. Image data is generated based on the read electric charge signal, and an image indicated by the generated image data is displayed on a display.

SUMMARY

One embodiment of the present invention provides an imaging element, an imaging apparatus, an image data processing method, and a program capable of performing imaging by avoiding an effect of a flicker.

A first aspect according to the technology of the present disclosure is an imaging element comprising a storage portion that stores captured image data obtained by imaging a subject at a first frame rate and is incorporated in the imaging element, a processing portion that performs processing based on the captured image data stored in the storage portion and is incorporated in the imaging element, and an output portion that outputs output image data based on the captured image data to an outside of the imaging element at a second frame rate and is incorporated in the imaging element, in which the first frame rate is a frame rate higher than the second frame rate and is determined in accordance with an occurrence cycle of a flicker, and the processing portion detects a flicker effect avoidance timing at which an effect of the flicker on imaging by the imaging element is avoided, based on the captured image data of a plurality of frames.

Accordingly, the imaging element of the first aspect according to the technology of the present disclosure can perform imaging by avoiding the effect of the flicker.

A second aspect according to the technology of the present disclosure is the imaging element according to the first aspect, in which the processing includes measurement and detection processing of measuring a brightness difference between frames of the captured image data and detecting the flicker effect avoidance timing based on the measured brightness difference, and a processing time period required for the measurement and detection processing is determined in accordance with the occurrence cycle.

Accordingly, the imaging element of the second aspect according to the technology of the present disclosure can accurately determine the processing time period required for the measurement and detection processing, compared to a case of not using the brightness difference between the frames of the captured image data.

A third aspect according to the technology of the present disclosure is the imaging element according to the second aspect, in which the captured image data is categorized into first captured image data and second captured image data obtained by imaging later than the first captured image data between the frames, the brightness difference is a subtraction result of subtracting brightness of the second captured image data from brightness of the first captured image data, and the flicker effect avoidance timing is a timing at which the brightness difference changes from a positive value to a negative value.

Accordingly, the imaging element of the third aspect according to the technology of the present disclosure can detect, as the flicker effect avoidance timing, a timing at which an image indicated by the captured image data is brightest.

A fourth aspect according to the technology of the present disclosure is the imaging element according to the third aspect, in which the processing portion stops the measurement and detection processing on a condition that the brightness difference changes from the positive value to the negative value twice.

Accordingly, the imaging element of the fourth aspect according to the technology of the present disclosure can set the processing time period required for the measurement and detection processing to a minimum necessary time period.

A fifth aspect according to the technology of the present disclosure is the imaging element according to the third aspect or the fourth aspect, in which the second captured image data is image data obtained by imaging after two or more frames from the first captured image data.

Accordingly, the imaging element of the fifth aspect according to the technology of the present disclosure can suppress erroneous detection of the flicker effect avoidance timing, compared to a case of using the brightness difference between adjacent frames.

A sixth aspect according to the technology of the present disclosure is the imaging element according to any one aspect of the second aspect to the fifth aspect, in which the first frame rate is set to a frame rate lower than a frame rate in the measurement and detection processing during a period until a predetermined condition is satisfied after the measurement and detection processing is performed.

Accordingly, the imaging element of the sixth aspect according to the technology of the present disclosure can reduce electric power consumption, compared to a case where the frame rate in the measurement and detection processing is also applied to processing other than the measurement and detection processing.

A seventh aspect according to the technology of the present disclosure is the imaging element according to the sixth aspect, in which the processing portion performs the measurement and detection processing again in a case where the predetermined condition is satisfied.

Accordingly, the imaging element of the seventh aspect according to the technology of the present disclosure can reduce electric power consumption, compared to a case where the measurement and detection processing is executed at all times.

An eighth aspect according to the technology of the present disclosure is the imaging element according to the seventh aspect, in which in a case where the predetermined condition is satisfied and the brightness difference measured by the processing portion changes from the brightness difference measured in the processing time period, the measurement and detection processing is performed again.

Accordingly, the imaging element of the eighth aspect according to the technology of the present disclosure can avoid unnecessary execution of the measurement and detection processing.

A ninth aspect according to the technology of the present disclosure is the imaging element according to any one aspect of the second aspect to the eighth aspect, in which the brightness difference is a brightness difference between partial regions that correspond to each other between the frames of the captured image data.

Accordingly, the imaging element of the ninth aspect according to the technology of the present disclosure can measure the brightness difference less affected by a motion of the subject and/or a camera shake, compared to a case where the brightness difference is measured from the entire image region between the frames of the captured image data as a target.

A tenth aspect according to the technology of the present disclosure is the imaging element according to any one aspect of the first aspect to the ninth aspect, in which the flicker effect avoidance timing is a timing at which brightness of an image indicated by the captured image data reaches a peak.

Accordingly, the imaging element of the tenth aspect according to the technology of the present disclosure can obtain a bright image, compared to a case where a timing different from the timing at which the brightness of the image indicated by the captured image data reaches the peak is set as the flicker effect avoidance timing.

An eleventh aspect according to the technology of the present disclosure is the imaging element according to any one aspect of the first aspect to the eighth aspect, in which the output image data is image data based on the captured image data obtained by imaging at the flicker effect avoidance timing.

Accordingly, the imaging element of the eleventh aspect according to the technology of the present disclosure can output the output image data that avoids the effect of the flicker.

A twelfth aspect according to the technology of the present disclosure is the imaging element according to any one aspect of the first aspect to the eleventh aspect, in which the flicker is a line flicker, and the subject is imaged in an imaging region that is selected in accordance with a crop coefficient determined in accordance with the flicker effect avoidance timing.

Accordingly, the imaging element of the twelfth aspect according to the technology of the present disclosure can suppress capturing of the line flicker in the image, compared to a case where imaging is performed in the entire imaging region.

A thirteenth aspect according to the technology of the present disclosure is the imaging element according to any one aspect of the first aspect to the twelfth aspect, in which the occurrence cycle is predetermined as an occurrence cycle of a flicker occurring due to a light source that flickers by being supplied with alternating current electric power from a commercial power source.

Accordingly, the imaging element of the thirteenth aspect according to the technology of the present disclosure can reduce an effort of determining the occurrence cycle of the flicker, compared to a case where the occurrence cycle of the flicker is not predetermined.

An imaging element of a fourteenth aspect according to the technology of the present disclosure is the imaging element according to any one aspect of the first aspect to the thirteenth aspect, in which the first frame rate is increased as the occurrence cycle is shortened.

Accordingly, the imaging element of the fourteenth aspect according to the technology of the present disclosure can increase detection accuracy of the flicker effect avoidance timing, compared to a case where the first frame rate is fixed.

A fifteenth aspect according to the technology of the present disclosure is the imaging element according to any one aspect of the first aspect to the fourteenth aspect, in which the captured image data is image data obtained by imaging the subject using a rolling shutter method.

Accordingly, the imaging element of the fifteenth aspect according to the technology of the present disclosure can avoid the effect of the flicker that occurs in a case where the subject is imaged using the rolling shutter method.

A sixteenth aspect according to the technology of the present disclosure is the imaging element according to any one aspect of the first aspect to the fifteenth aspect, in which the imaging element is a laminated imaging element that includes the photoelectric conversion element and in which the photoelectric conversion element is laminated with the storage portion.

Accordingly, the imaging element of the sixteenth aspect according to the technology of the present disclosure can increase the detection accuracy of the flicker effect avoidance timing, compared to a case of using an imaging element of a type in which the photoelectric conversion element is not laminated with a storage portion.

A seventeenth aspect according to the technology of the present disclosure is an imaging apparatus comprising the imaging element according to any one aspect of the first aspect to the sixteenth aspect, and a control portion that performs a control for displaying, on a display portion, an image based on the output image data output by the output portion included in the imaging element.

Accordingly, the imaging apparatus of the seventeenth aspect according to the technology of the present disclosure can perform imaging by avoiding the effect of the flicker.

An eighteenth aspect according to the technology of the present disclosure is an image data processing method of an imaging element incorporating a storage portion that stores captured image data obtained by imaging a subject at a first frame rate, a processing portion that performs processing based on the captured image data stored in the storage portion, and an output portion that outputs output image data based on the captured image data to an outside at a second frame rate, the image data processing method comprising setting the first frame rate to a frame rate higher than the second frame rate and determining the first frame rate in accordance with an occurrence cycle of a flicker, and detecting a flicker effect avoidance timing at which an effect of the flicker on imaging by the imaging element is avoided, by the processing portion based on the captured image data of a plurality of frames.

Accordingly, the image data processing method of the eighteenth aspect according to the technology of the present disclosure enables imaging by avoiding the effect of the flicker.

A nineteenth aspect according to the technology of the present disclosure is a program causing a computer to function as a processing portion and an output portion included in an imaging element incorporating a storage portion that stores captured image data obtained by imaging a subject at a first frame rate, the processing portion that performs processing based on the captured image data stored in the storage portion, and the output portion that outputs output image data based on the captured image data to an outside at a second frame rate, in which the first frame rate is a frame rate higher than the second frame rate and is determined in accordance with an occurrence cycle of a flicker, and the processing portion detects a flicker effect avoidance timing at which an effect of the flicker on imaging by the imaging element is avoided, based on the captured image data of a plurality of frames.

Accordingly, the iprogram of the nineteenth aspect according to the technology of the present disclosure enables imaging by avoiding the effect of the flicker.

A twentieth aspect according to the technology of the present disclosure is an imaging element comprising a memory that stores captured image data obtained by imaging a subject at a first frame rate and is incorporated in the imaging element, and a processor that performs processing based on the captured image data stored in the memory, outputs output image data based on the captured image data to an outside of the imaging element at a second frame rate, and is incorporated in the imaging element, in which the first frame rate is a frame rate higher than the second frame rate and is determined in accordance with an occurrence cycle of a flicker, and the processor detects a flicker effect avoidance timing at which an effect of the flicker on imaging by the imaging element is avoided, based on the captured image data of a plurality of frames.

According to one embodiment of the present invention, an effect of being able to perform imaging by avoiding the effect of the flicker is achieved.

BRIEF DESCRIPTION OF THE DRAWINGS

Exemplary embodiments of the present invention will be described in detail based on the following figures, wherein.

DETAILED DESCRIPTION

In a case where imaging using the rolling shutter method is performed, a rolling shift of the electronic shutter and a rolling shift of the mechanical shutter occur. For example, the rolling shift of the electronic shutter refers to a difference in time from a start of exposure on a head line of the photoelectric conversion element until a start of exposure on a last line. In addition, for example, the rolling shift of the mechanical shutter is a difference in time from passage of the head line of the photoelectric conversion element by a front curtain of the mechanical shutter until passage of the last line.

Figure 28:
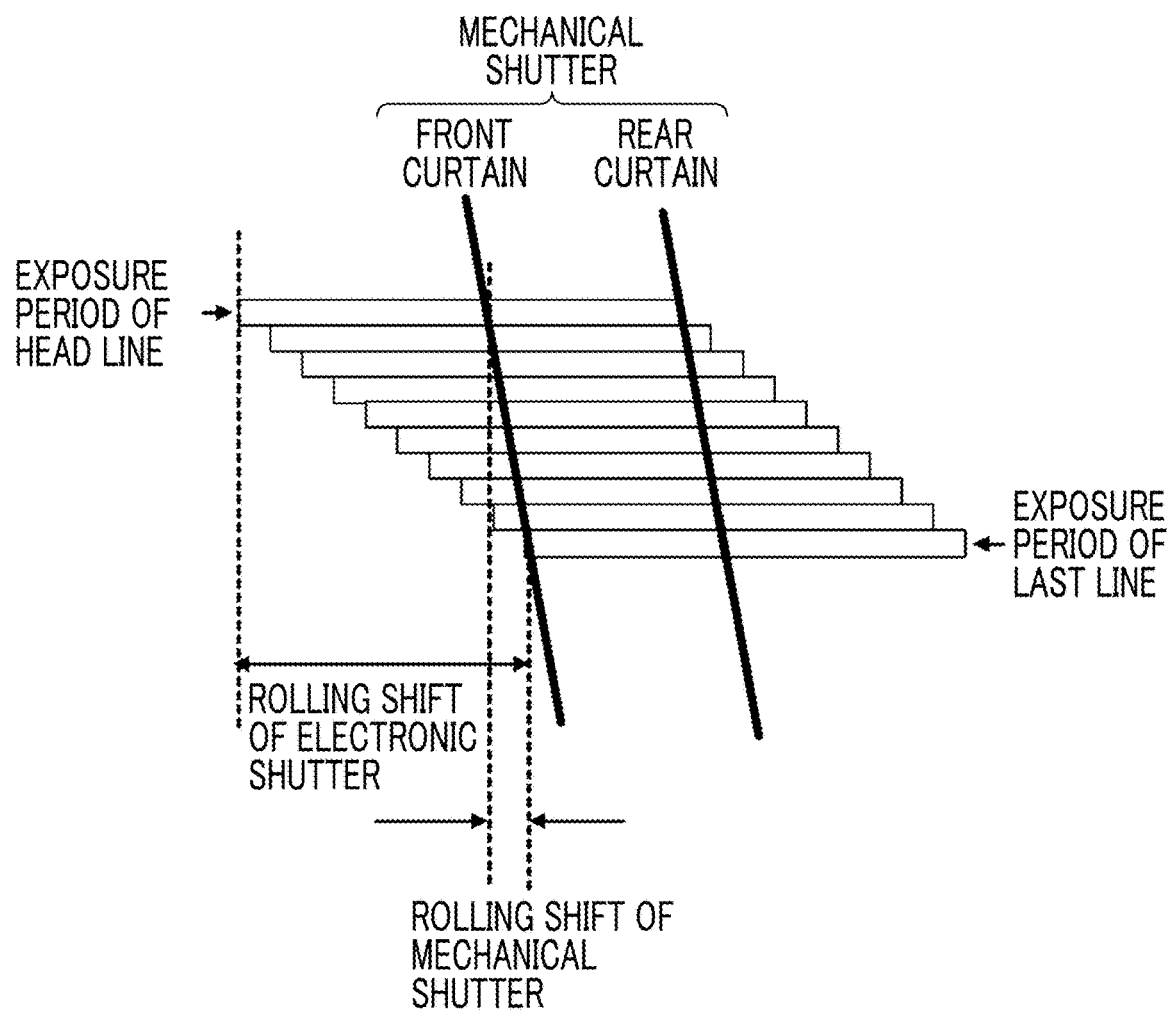
FIG. 28 is a conceptual diagram illustrating one example of a relationship between a rolling shift of the electronic shutter and a rolling shift of the mechanical shutter.

For example, as illustrated in FIG. 28, the rolling shift of the electronic shutter of the imaging element is longer than the rolling shift of the mechanical shutter. In the example illustrated in FIG. 28, the rolling shift of the mechanical shutter is shorter than the rolling shift of the electronic shutter.

Figure 30:
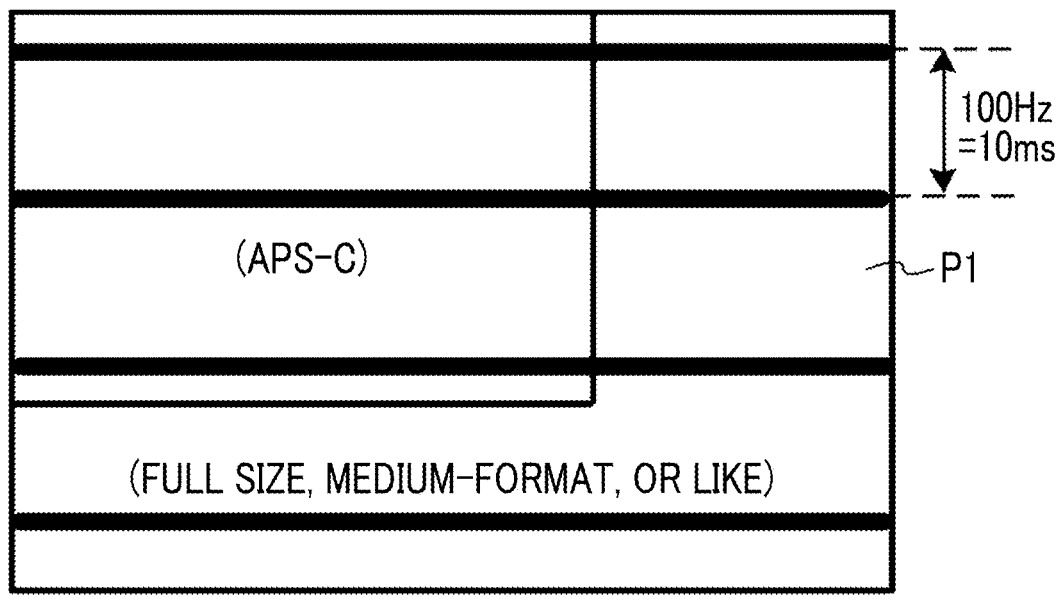
FIG. 30 is an image diagram illustrating one example of a captured image obtained by performing imaging using a rolling shutter method of the example illustrated in FIG. 28.

In a case where a frequency of a commercial power source is 50 hertz (Hz), for example, a light source such as a fluorescent lamp that flickers by being supplied with electric power from the commercial power source flickers at a frequency of 100 Hz. In such an environment, in a case where imaging is performed using the rolling shutter method, for example, as illustrated in FIG. 30, line flickers appear at intervals corresponding to 10 ms in a vertical direction in a captured image P1 obtained by imaging. In a case where a live view image is displayed, a plurality of line flickers appear as flowing in the vertical direction.

For example, in a case where imaging using the rolling shutter method illustrated in FIG. 28 is performed by a photoelectric conversion element of a full size, a medium-format size, or the like, for example, as illustrated in FIG. 30, four line flickers appear in the captured image P1 obtained by imaging. In addition, for example, in a case where imaging using the rolling shutter method illustrated in FIG. 28 is performed by a photoelectric conversion element of an advanced photo system type C (APS-C) size that is a size smaller than the full size, the medium-format size, or the like, for example, as illustrated in FIG. 30, three line flickers appear in the captured image P1.

Figure 29:
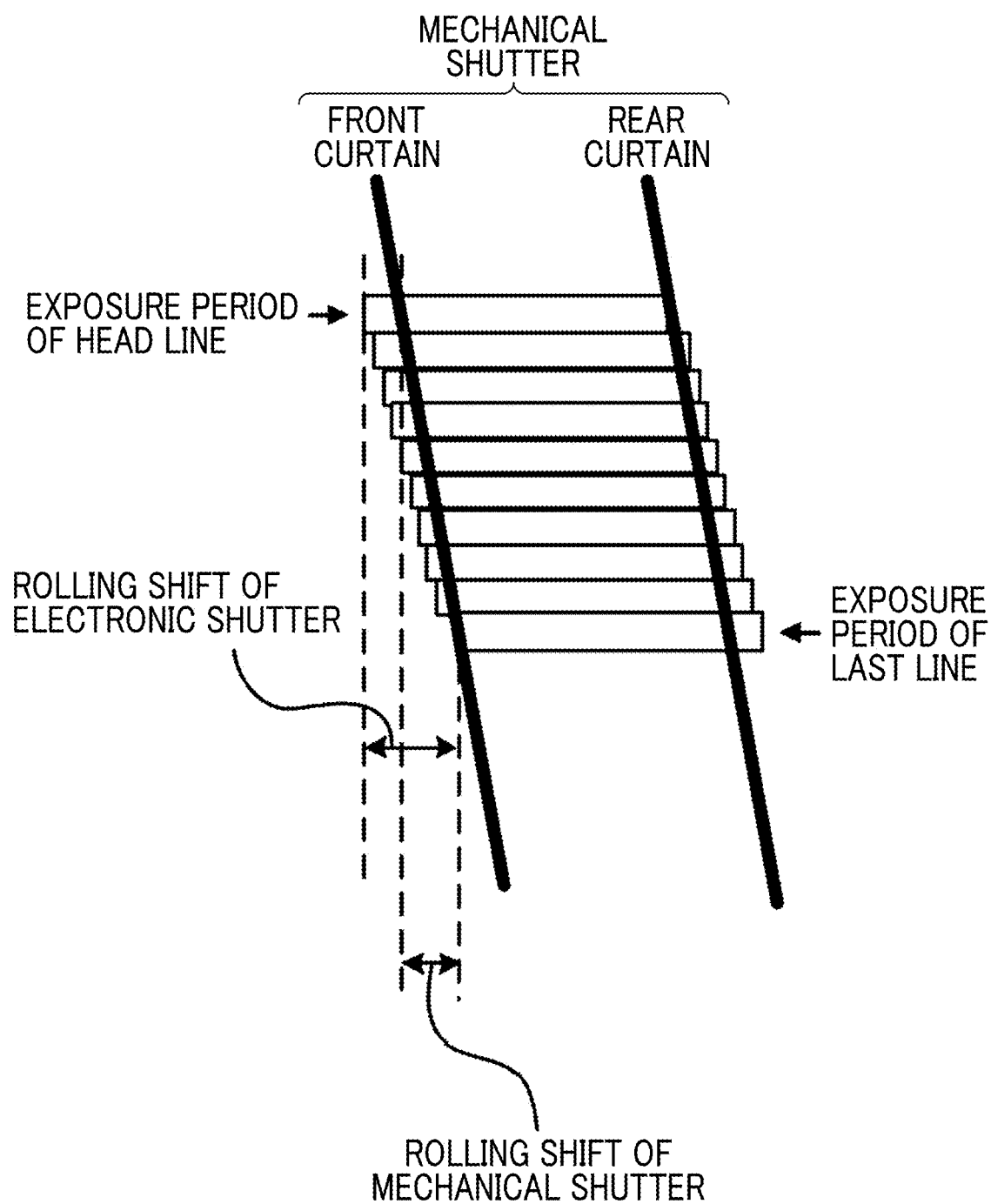
FIG. 29 is a conceptual diagram illustrating one example of a relationship between the rolling shift of the electronic shutter and the rolling shift of the mechanical shutter in a case where the rolling shift of the electronic shutter becomes shorter than the example illustrated in FIG. 28.

Meanwhile, in recent years, for example, as illustrated in FIG. 29, a time period of the rolling shift of the electronic shutter has become shorter than the related art, and a timing of the rolling shift of the electronic shutter has been approximated to a timing of the rolling shift of the mechanical shutter, compared to the related art.

That is, for example, in imaging using the rolling shutter method illustrated in FIG. 29, the timing of the rolling shift of the electronic shutter is approximated to the timing of the rolling shift of the mechanical shutter, compared to, for example, imaging using the rolling shutter method illustrated in FIG. 28.

Accordingly, for example, in a case where imaging is performed using the rolling shutter method illustrated in FIG. 29, the number of line flickers appearing in the captured image is reduced, compared to, for example, imaging using the rolling shutter method illustrated in FIG. 28.

Figure 31:
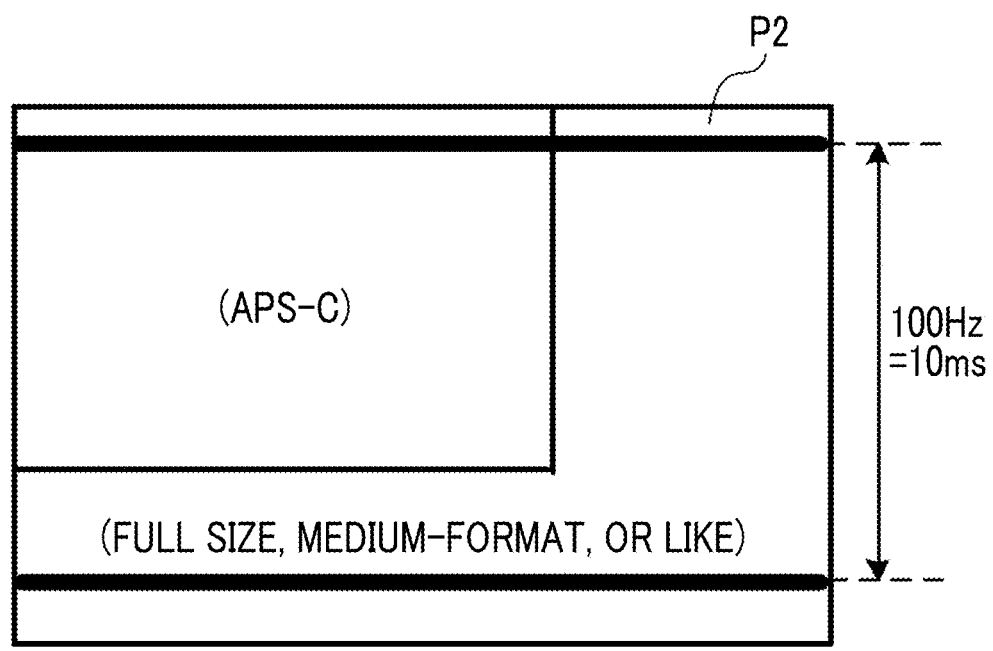
FIG. 31 is an image diagram illustrating one example of a captured image obtained by performing imaging using a rolling shutter method of the example illustrated in FIG. 29.

For example, in a case where imaging using the rolling shutter method illustrated in FIG. 29 is performed by the photoelectric conversion element of the full size, the medium-format size, or the like, for example, as illustrated in FIG. 31, two line flickers appear in a captured image P2. In addition, for example, in a case where imaging using the rolling shutter method illustrated in FIG. 29 is performed by the photoelectric conversion element of the APS-C size, for example, as illustrated in FIG. 31, the interval between the line flickers becomes longer than a length of an image region corresponding to the imaging region of the APS-C size in the vertical direction. Thus, only one line flicker appears in the image region corresponding to the imaging region of the APS-C size in the captured image P2.

In a case of performing imaging using a rolling shutter method that avoids an effect of the line flicker, it is important to specify an imaging timing at which the effect of the line flicker can be avoided. However, in the technologies disclosed in JP2017-188760A, JP2018-007210A, WO2015/163145A, and JP2017-501627A, while presence or absence of the line flicker can be detected, it is difficult to specify the imaging timing at which the effect of the line flicker can be avoided. In addition, for example, as illustrated in FIG. 31, in a case where only one line flicker appears in the image region corresponding to the imaging region of the APS-C size in the captured image P2, it is more difficult to specify the imaging timing at which the effect of the line flicker can be avoided.

The same can be said even in a case where imaging using a global shutter method is performed. In a case of imaging using the global shutter method, a surface flicker is detected by the photoelectric conversion element. However, even in this case, in order to perform imaging that avoids an effect of the surface flicker, it is important to specify an imaging timing at which the effect of the surface flicker can be avoided. In a case of using the technologies disclosed in JP2017-188760A, JP2018-007210A, WO2015/163145A, and JP2017-501627A, presence or absence of the surface flicker can be detected. However, it is difficult to specify the imaging timing at which the effect of the surface flicker can be avoided.

One embodiment of the present invention provides an imaging element, an imaging apparatus, an image data processing method, and a program capable of performing imaging by avoiding an effect of a flicker.

Hereinafter, one example of an embodiment of an imaging apparatus according to the embodiment of the technology of the present disclosure will be described in accordance with the appended drawings.

Figure 1:
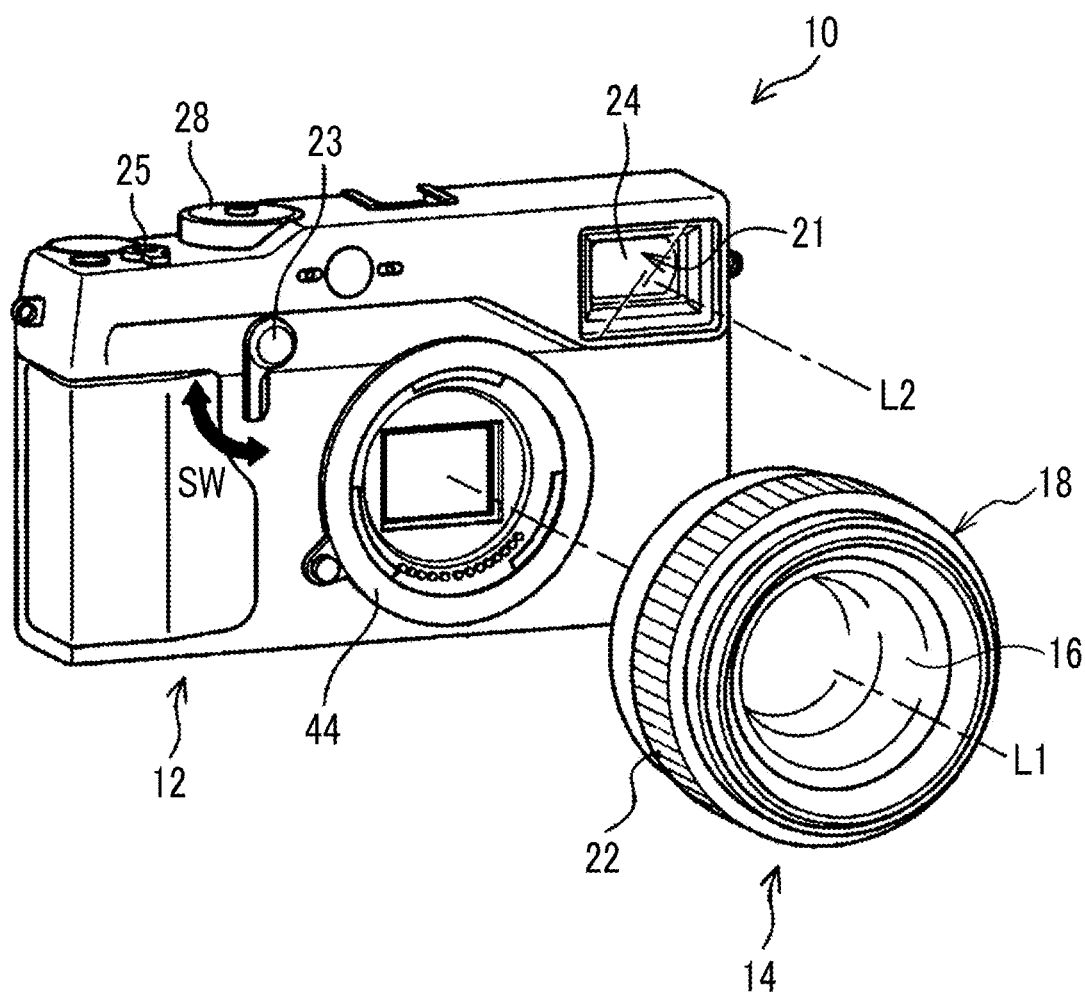
FIG. 1 is a perspective view illustrating one example of an exterior of an imaging apparatus that is an interchangeable lens camera according to an embodiment.

For example, as illustrated in FIG. 1, an imaging apparatus 10 is an interchangeable lens camera. The imaging apparatus 10 is a digital camera that includes an imaging apparatus main body 12 and an interchangeable lens 14 interchangeably mounted on the imaging apparatus main body 12, and that does not include a reflex mirror. The interchangeable lens 14 includes an imaging lens 18 including a focus lens 16 that is movable in an optical axis direction by a manual operation.

A hybrid finder (registered trademark) 21 is disposed in the imaging apparatus main body 12. For example, the hybrid finder 21 here refers to a finder in which an optical view finder (hereinafter, referred to as the OVF) and an electronic view finder (hereinafter, referred to as the EVF) are selectively used. The abbreviation OVF refers to "Optical View Finder". The abbreviation EVF refers to "Electronic View Finder".

The interchangeable lens 14 is interchangeably mounted on the imaging apparatus main body 12. A focus ring 22 that is used in a case of a manual focus mode is disposed in a lens barrel of the interchangeable lens 14. The focus lens 16 moves in the optical axis direction in accordance with a manual rotation operation of the focus ring 22, and an image of subject light is formed on an imaging element 20 (refer to FIG. 3), described later, at a focal position corresponding to a subject distance.

A finder window 24 of the OVF included in the hybrid finder 21 is disposed on a front surface of the imaging apparatus main body 12. In addition, a finder switching lever (finder switching portion) 23 is disposed on the front surface of the imaging apparatus main body 12. In a case where the finder switching lever 23 is rotationally moved in a direction of arrow SW, switching is performed between an optical image that is visually recognizable by the OVF, and an electronic image (live view image) that is visually recognizable by the EVF. The live view image refers to a motion picture image for displaying obtained by imaging by a photoelectric conversion element.

An optical axis L2 of the OVF is an optical axis different from an optical axis L1 of the interchangeable lens 14. A release button 25 and a dial 28 for setting such as a mode of an imaging system and a mode of a playback system are disposed on an upper surface of the imaging apparatus main body 12.

The release button 25 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

In the imaging apparatus 10 according to the present embodiment, an imaging mode and a playback mode are selectively set as an operation mode in accordance with an instruction of a user. In the imaging mode, the manual focus mode and an auto focus mode are selectively set in accordance with an instruction of the user. In the auto focus mode, an imaging condition is adjusted by setting the release button 25 to the half push state. Then, in a case where the full push state is subsequently set, exposure is performed. That is, after an exposure state is set by an automatic exposure (AE) function by setting the release button 25 to the half push state, a focusing control is performed by an auto-focus (AF) function. In a case where the release button 25 is set to the full push state, imaging is performed.

Figure 2:
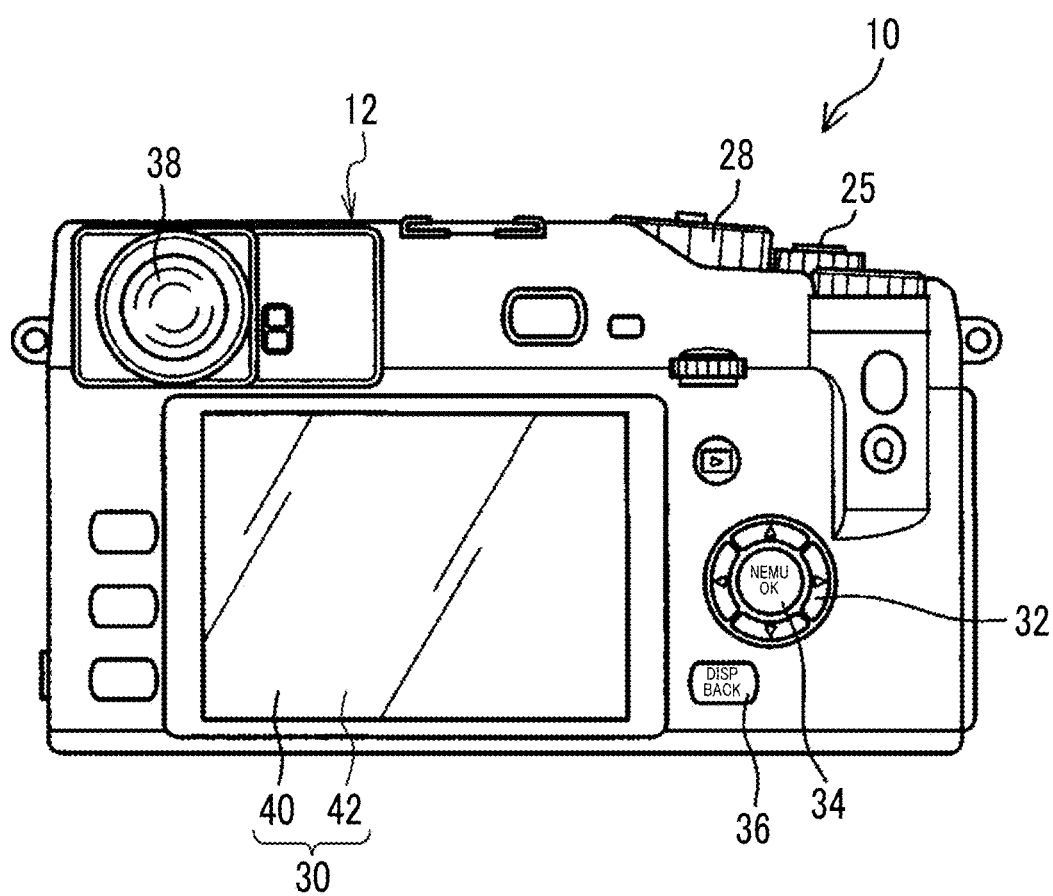
FIG. 2 is a rear view illustrating a rear surface side of the imaging apparatus according to the embodiment.

For example, as illustrated in FIG. 2, a touch panel display 30, a cross key 32, a menu key 34, an instruction button 36, and a finder eyepiece portion 38 are disposed on a rear surface of the imaging apparatus main body 12.

The touch panel display 30 comprises a liquid crystal display (hereinafter, referred to as a "first display") 40 and a touch panel 42 (refer to FIG. 3).

The first display 40 displays an image, text information, and the like. The first display 40 is used for displaying the live view image (live preview image) that is one example of a consecutive frame image obtained by imaging in consecutive frames in a case of the imaging mode. In addition, the first display 40 is used for displaying a still picture image that is one example of a single frame image obtained by imaging in a single frame in a case where a still picture imaging instruction is provided. Furthermore, the first display 40 is used for displaying a playback image in a case of the playback mode and displaying a menu screen or the like.

The touch panel 42 is a transmissive touch panel and is overlaid on a surface of a display region of the first display 40. The touch panel 42 detects a contact of an instruction object such as a finger or a stylus pen. The touch panel 42 outputs detection result information indicating a detection result (presence or absence of the contact of the instruction object with the touch panel 42) to a predetermined output destination (for example, a CPU 52 (refer to FIG. 3)

described later) in a predetermined cycle (for example, 100 milliseconds). In a case where the touch panel 42 detects the contact of the instruction object, the detection result information includes two-dimensional coordinates (hereinafter, referred to as the "coordinates") capable of specifying a contact position of the instruction object on the touch panel 42. In a case where the touch panel 42 does not detect the contact of the instruction object, the detection result information does not include the coordinates.

The cross key 32 has a function as a multifunction key that outputs various instruction signals for selecting one or a plurality of menus, zooming, and/or frame advance or the like. The menu key 34 is an operation key that has both of a function as a menu button for providing an instruction to display one or a plurality of menus on a screen of the first display 40 and a function as an instruction button for providing an instruction for confirmation, execution, and the like of a selected content. The instruction button 36 is operated in a case of deleting a desired target such as a selected item, canceling a designated content, and returning to an immediately previous operation state.

The imaging apparatus 10 has a still picture imaging mode and a motion picture imaging mode as an operation mode of the imaging system. The still picture imaging mode is an operation mode in which the still picture image obtained by imaging the subject by the imaging apparatus 10 is recorded, and the motion picture imaging mode is an operation mode in which the motion picture image obtained by imaging the subject by the imaging apparatus 10 is recorded.

Figure 3:
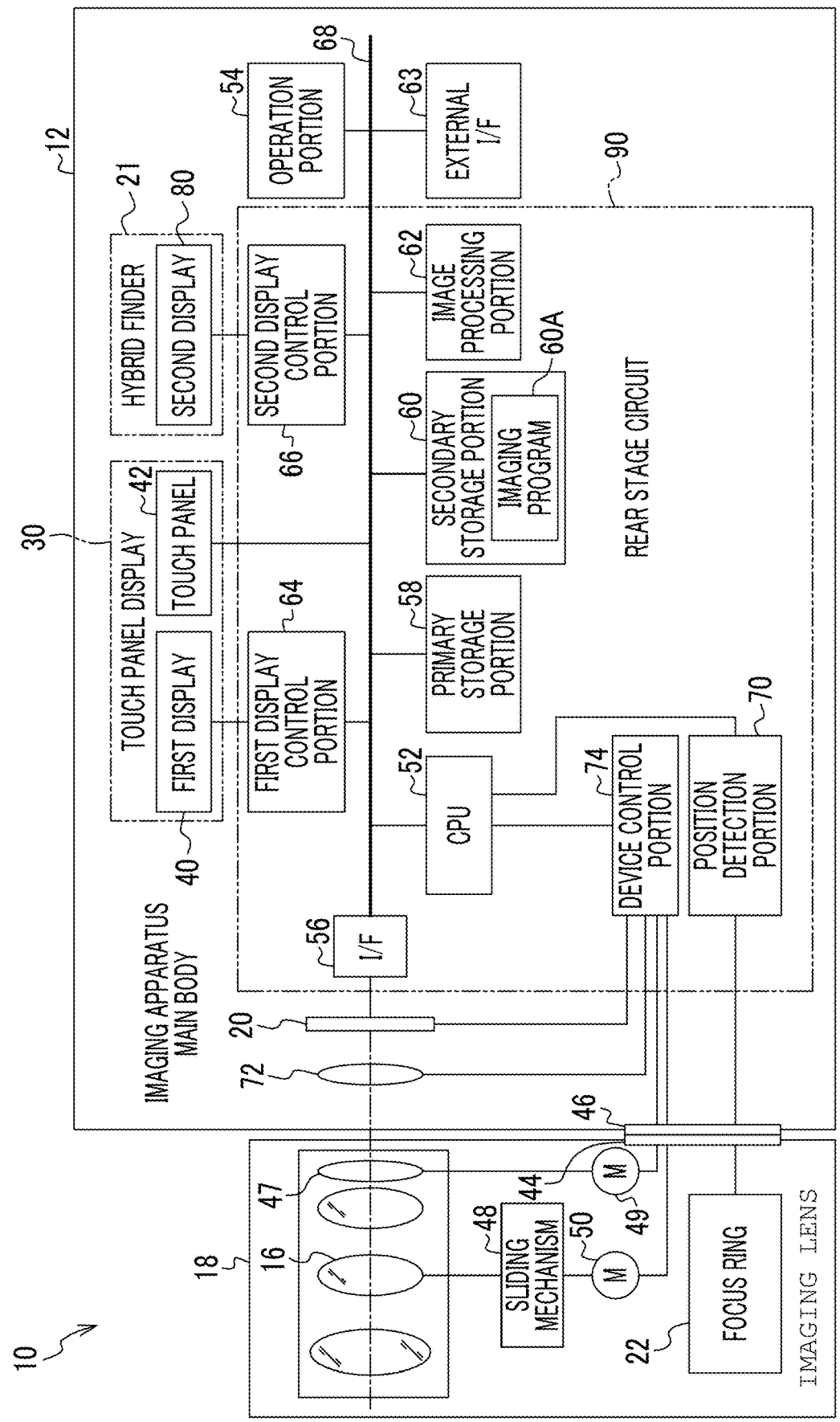
FIG. 3 is a block diagram illustrating one example of a hardware configuration of the imaging apparatus according to the embodiment.

For example, as illustrated in FIG. 3, the imaging apparatus 10 includes a mount 46 (refer to FIG. 1) comprised in the imaging apparatus main body 12, and a mount 44 on an interchangeable lens 14 side corresponding to the mount 46. The interchangeable lens 14 is interchangeably mounted on the imaging apparatus main body 12 by joining the mount 44 to the mount 46.

The imaging lens 18 includes a stop 47 and a motor 49. The stop 47 is arranged on an imaging apparatus main body 12 side of the focus lens 16 and is connected to the motor 49. The stop 47 operates to adjust the exposure by receiving motive power of the motor 49.

The imaging lens 18 includes a sliding mechanism 48 and a motor 50. Operating the focus ring 22 causes the sliding mechanism 48 to move the focus lens 16 along an optical axis L1. The focus lens 16 is attached to the sliding mechanism 48 in a slidable manner along the optical axis L1. The motor 50 is connected to the sliding mechanism 48, and the sliding mechanism 48 slides the focus lens 16 along the optical axis L1 by receiving motive power of the motor 50.

The motors 49 and 50 are connected to the imaging apparatus main body 12 through the mounts 44 and 46, and driving thereof is controlled in accordance with a command from the imaging apparatus main body 12. In the present embodiment, stepping motors are applied as one example of the motors 49 and 50. Accordingly, the motors 49 and 50 operate in synchronization with pulse electric power in accordance with the command from the imaging apparatus main body 12. While an example in which the motors 49 and 50 are disposed in the imaging lens 18 is illustrated in the example illustrated in FIG. 3, the technology of the present disclosure is not limited thereto, and the motors 49 and 50 may be disposed in the imaging apparatus main body 12.

The imaging apparatus 10 is a digital camera that records the still picture image and the motion picture image obtained by imaging the subject. The imaging apparatus main body 12 comprises an operation portion 54, an external interface (I/F) 63, and a rear stage circuit 90. The rear stage circuit 90 is a circuit on a side of receiving data transmitted from the imaging element 20. In the present embodiment, an integrated circuit (IC) is employed as the rear stage circuit 90. A large-scale integration (LSI) is illustrated as one example of the IC. The rear stage circuit 90 is one example of a "circuit" according to the embodiment of the technology of the present disclosure.

The rear stage circuit 90 includes the central processing unit (CPU) 52, an I/F 56, a primary storage portion 58, a secondary storage portion 60, an image processing portion 62, a first display control portion 64, a second display control portion 66, a position detection portion 70, and a device control portion 74. A single CPU is illustrated as the CPU 52 in the present embodiment. However, the technology of the present disclosure is not limited thereto, and a plurality of CPUs may be employed instead of the CPU 52. That is, various types of processing executed by the CPU 52 may be executed by one processor or a plurality of physically separated processors.

In the present embodiment, each of the image processing portion 62, the first display control portion 64, the second display control portion 66, the position detection portion 70, and the device control portion 74 is implemented by an application specific integrated circuit (ASIC). However, the technology of the present disclosure is not limited thereto. For example, instead of the ASIC, at least one of a programmable logic device (PLD) or a field-programmable gate array (FPGA) may be employed. Alternatively, at least one of the ASIC, the PLD, or the FPGA may be employed. Alternatively, a computer including a CPU, a read only memory (ROM), and a random access memory (RAM) may be employed. The CPU may be a single CPU or a plurality of CPUs. In addition, at least one of the image processing portion 62, the first display control portion 64, the second display control portion 66, the position detection portion 70, or the device control portion 74 may be implemented by a combination of a hardware configuration and a software configuration.

The CPU 52, the I/F 56, the primary storage portion 58, the secondary storage portion 60, the image processing portion 62, the first display control portion 64, the second display control portion 66, the operation portion 54, the external I/F 63, and the touch panel 42 are connected to each other through a bus 68.

The CPU 52 controls the entire imaging apparatus 10. In the imaging apparatus 10 according to the present embodiment, in a case of the auto focus mode, the CPU 52 performs the focusing control by controlling driving of the motor 50 such that a contrast value of the image obtained by imaging is maximized. In addition, in a case of the auto focus mode, the CPU 52 calculates AE information that is a physical quantity indicating brightness of the image obtained by imaging. In a case where the release button 25 is set to the half push state, the CPU 52 derives a shutter speed and an F number corresponding to the brightness of the image indicated by the AE information. The exposure state is set by controlling each related portion to achieve the derived shutter speed and the F number.

The primary storage portion 58 means a volatile memory and refers to, for example, a RAM. The secondary storage portion 60 means a non-volatile memory and refers to, for example, a flash memory or a hard disk drive (HDD).

The secondary storage portion 60 stores an imaging program 60A. The CPU 52 reads out the imaging program 60A from the secondary storage portion 60 and loads the read imaging program 60A into the primary storage portion 58. The CPU 52 executes imaging processing (refer to FIG. 16) described later in accordance with the imaging program 60A loaded in the primary storage portion 58.

The operation portion 54 is a user interface that is operated by the user in a case of providing various instructions to the rear stage circuit 90. The operation portion 54 includes the release button 25, the dial 28, the finder switching lever 23, the cross key 32, the menu key 34, and the instruction button 36. Various instructions received by the operation portion 54 are output to the CPU 52 as an operation signal, and the CPU 52 executes processing corresponding to the operation signal input from the operation portion 54.

The position detection portion 70 is connected to the CPU 52. The position detection portion 70 is connected to the focus ring 22 through the mounts 44 and 46, detects a rotation angle of the focus ring 22, and outputs rotation angle information indicating the rotation angle that is a detection result to the CPU 52. The CPU 52 executes processing corresponding to the rotation angle information input from the position detection portion 70.

In a case where the imaging mode is set, image light showing the subject is formed on a light receiving surface of the color imaging element 20 through the imaging lens 18 including the focus lens 16 movable by a manual operation, and a mechanical shutter 72.

The device control portion 74 is connected to the CPU 52. In addition, the device control portion 74 is connected to the imaging element 20 and the mechanical shutter 72. Furthermore, the device control portion 74 is connected to the motors 49 and 50 of the imaging lens 18 through the mounts 44 and 46.

The device control portion 74 controls the imaging element 20, the mechanical shutter 72, and the motors 49 and 50 under control of the CPU 52.

Figure 4:
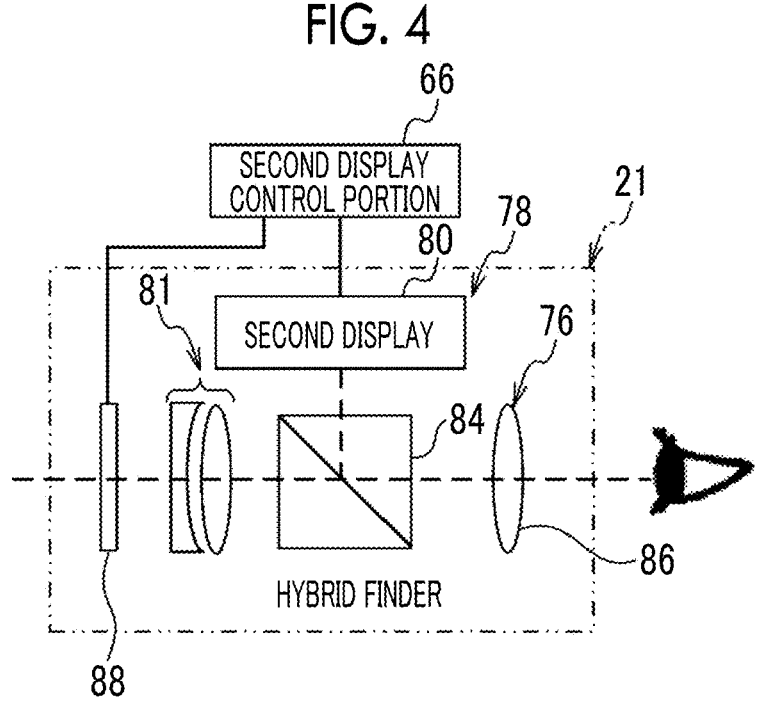
FIG. 4 is a schematic configuration diagram illustrating one example of a configuration of a hybrid finder of the imaging apparatus according to the embodiment.

For example, as illustrated in FIG. 4, the hybrid finder 21 includes an OVF 76 and an EVF 78. The OVF 76 is a reverse Galilean finder including an objective lens 81 and an eyepiece lens 86, and the EVF 78 includes the second display 80, a prism 84, and the eyepiece lens 86.

A liquid crystal shutter 88 is arranged in front of the objective lens 81. The liquid crystal shutter 88 blocks light such that the optical image is not incident on the objective lens 81 in a case of using the EVF 78.

The prism 84 reflects and guides the electronic image or various information to be displayed on the second display 80 to the eyepiece lens 86 and combines the optical image with the electronic image and/or various information to be displayed on the second display 80.

In a case where the finder switching lever 23 is rotationally moved in the direction of arrow SW illustrated in FIG. 1, an OVF mode in which the optical image is visually recognizable by the OVF 76 and an EVF mode in which the electronic image is visually recognizable by the EVF 78 are alternately switched each time the finder switching lever 23 is rotationally moved.

In a case of the OVF mode, the second display control portion 66 enables the optical image to be visually recognized from the eyepiece portion by controlling the liquid crystal shutter 88 to a non-light blocking state. In a case of the EVF mode, the second display control portion 66 enables only the electronic image displayed on the second display 80 to be visually recognized from the eyepiece portion by controlling the liquid crystal shutter 88 to a light blocking state.

In the following description, for convenience of description, the first display 40 and the second display 80 will be referred to as the "display apparatus" without a reference sign unless otherwise necessary to distinguish therebetween. The display apparatus is one example of a "display portion" according to the embodiment of the technology of the present disclosure. In addition, hereinafter, for convenience of description, the first display control portion 64 and the second display control portion 66 will be referred to as a "display control portion" without a reference sign unless otherwise necessary to distinguish therebetween for description.

Figure 5:
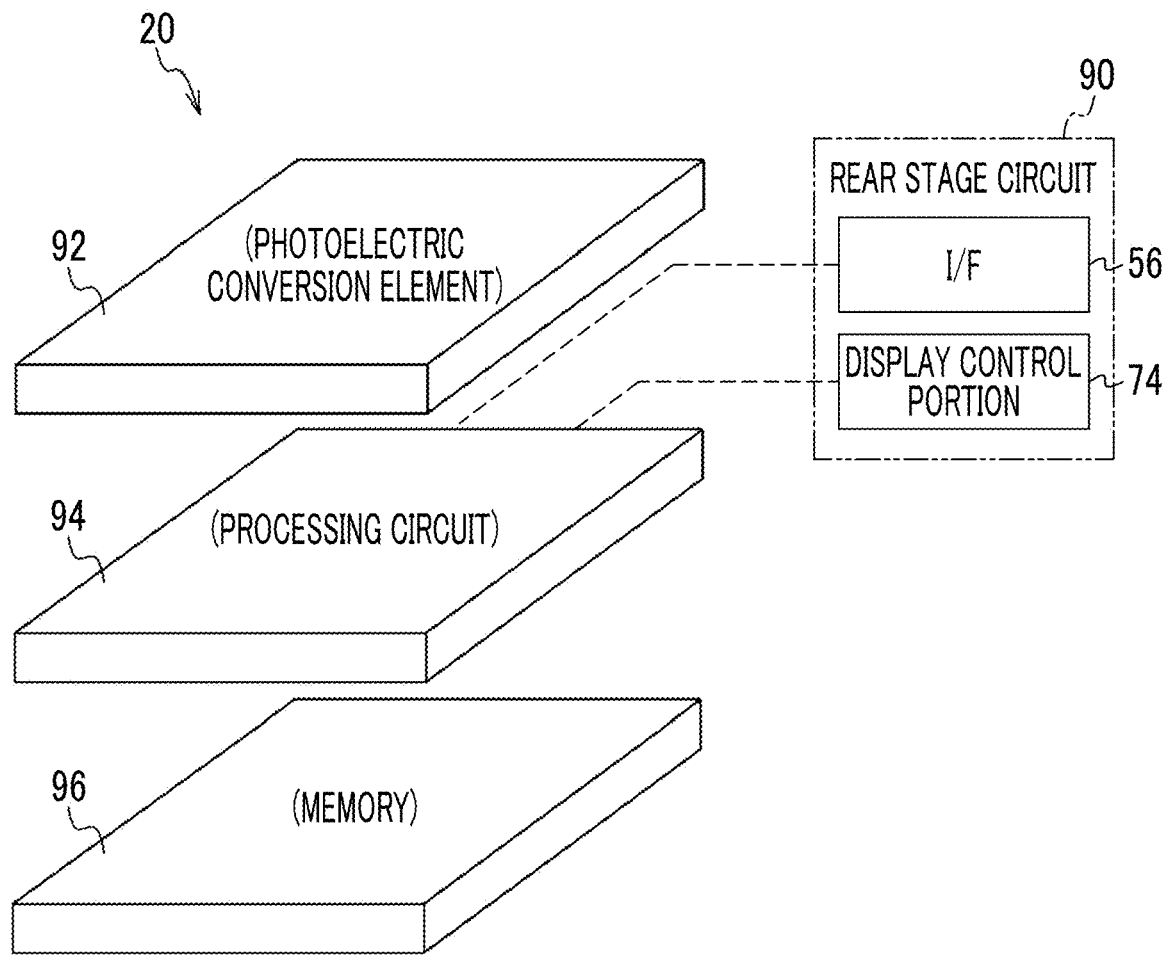
FIG. 5 is a schematic configuration diagram illustrating one example of a schematic configuration of an imaging element included in the imaging apparatus according to the embodiment.

The imaging element 20 is one example of a "laminated imaging element" according to the embodiment of the technology of the present disclosure. For example, the imaging element 20 is a complementary metal oxide semiconductor (CMOS) image sensor. For example, as illustrated in FIG. 5, the imaging element 20 incorporates a photoelectric conversion element 92, a processing circuit 94, and a memory 96. In the imaging element 20, the photoelectric conversion element 92 is laminated with the processing circuit 94 and the memory 96. The processing circuit 94 is one example of a "processing portion" according to the embodiment of the technology of the present disclosure, and the memory 96 is one example of a "storage portion" according to the embodiment of the technology of the present disclosure.

The processing circuit 94 is, for example, an LSI, and the memory 96 is, for example, a RAM. A dynamic random access memory (DRAM) is employed as one example of the memory 96 in the embodiment. However, the technology of the present disclosure is not limited thereto, and a static random access memory (SRAM) may be used.

The processing circuit 94 is implemented by an ASIC in the present embodiment. However, the technology of the present disclosure is not limited thereto. For example, at least one of a PLD or an FPGA may be employed instead of the ASIC. Alternatively, at least one of the ASIC, the PLD, or the FPGA may be employed. Alternatively, a computer including a CPU, a ROM, and a RAM may be employed. The CPU may be a single CPU or a plurality of CPUs. Alternatively, the processing circuit 94 may be implemented by a combination of a hardware configuration and a software configuration.

The photoelectric conversion element 92 includes a plurality of photosensors arranged in a matrix form. In the present embodiment, photodiodes are employed as one example of the photosensors. Photodiodes of "4896×3265" pixels are illustrated as one example of the plurality of photosensors.

The photoelectric conversion element 92 comprises color filters, and the color filters include a G filter corresponding to green (G) that most contributes to obtaining a brightness signal, an R filter corresponding to red (R), and a B filter corresponding to blue (B). In the present embodiment, the G filter, the R filter, and the B filter are arranged with a predetermined periodicity in each of a row direction (horizontal direction) and a column direction (vertical direction) for the plurality of photodiodes of the photoelectric conversion element 92. Thus, the imaging apparatus 10 can perform processing in accordance with a repeating pattern in a case of performing demosaicing and the like on R, G, and B signals. The demosaicing refers to processing of calculating all color information for each pixel from a mosaic image corresponding to color filter arrangement of a single plate color imaging element. For example, in a case of an imaging element consisting of color filters of three colors of R, G, and B, the demosaicing means processing of calculating color information about all of R, G, and B for each pixel from a mosaic image consisting of R, G, and B.

While the CMOS image sensor is illustrated as the imaging element 20, the technology of the present disclosure is not limited thereto. For example, the technology of the present disclosure is also established in a case where the photoelectric conversion elements 92 is a charge coupled device (CCD) image sensor.

The imaging element 20 has a so-called electronic shutter function and controls an electric charge accumulation time period of each photodiode in the photoelectric conversion element 92 by performing the electronic shutter function under control of the device control portion 74. The electric charge accumulation time period refers to a so-called shutter speed.

In the imaging apparatus 10, imaging for the still picture image and imaging for the motion picture image are performed using a rolling shutter method. The imaging for the still picture image is implemented by performing the electronic shutter function and operating the mechanical shutter 72. The imaging for the live view image is implemented by performing the electronic shutter function without operating the mechanical shutter 72.

The processing circuit 94 is controlled by the device control portion 74. The processing circuit 94 reads out captured image data that is obtained by imaging the subject by the photoelectric conversion element 92. The "captured image data" here refers to image data indicating the subject. The captured image data is signal electric charges accumulated in the photoelectric conversion element 92. The processing circuit 94 performs analog/digital (A/D) conversion on the captured image data read out from the photoelectric conversion element 92. The processing circuit 94 stores, in the memory 96, the captured image data obtained by performing the A/D conversion on the captured image data. The processing circuit 94 acquires the captured image data from the memory 96 and outputs, to the I/F 56 of the rear stage circuit 90, output image data that is image data based on the acquired captured image data. Hereinafter, for convenience of description, the "output image data that is image data based on the captured image data" will be simply referred to as the "output image data".

The processing circuit 94 performs first processing and second processing on the captured image data. The first processing refers to processing of reading out the captured image data from the photoelectric conversion element 92 and storing the read captured image data in the memory 96. The second processing refers to processing of outputting the output image data to an outside of the imaging element 20. For example, the "outside of the imaging element 20" here refers to the I/F 56 of the rear stage circuit 90. The rear stage circuit 90 is one example of a "circuit" according to the embodiment of the technology of the present disclosure.

In the imaging element 20, the subject is imaged at a first frame rate. The processing circuit 94 performs the first processing at the first frame rate and performs the second processing at a second frame rate. The first frame rate is a frame rate higher than the second frame rate.

In the present embodiment, 60 frames per second (fps) is employed as one example of the second frame rate. However, the technology of the present disclosure is not limited thereto, and the second frame rate can be changed as long as a relationship "second frame rate<first frame rate" is satisfied.

The first frame rate is a frame rate that is variable within a range of not less than or equal to the second frame rate. For example, in the present embodiment, the first frame rate is set as a frame rate that can be switched between a high frame rate and a low frame rate by the processing circuit 94.

The high frame rate refers to a frame rate higher than the low frame rate. In the present embodiment, 100 fps is employed as one example of the low frame rate. In addition, in the present embodiment, the high frame rate is broadly categorized into a first high frame rate and a second high frame rate. The first high frame rate is a frame rate that is employed in a case where a flicker occurrence cycle described later is 10 ms. The second high frame rate is a frame rate that is employed in a case where the flicker occurrence cycle described later is 8.33 ms. In the present embodiment, 200 fps is employed as one example of the first high frame rate, and 240 fps is employed as one example of the second high frame rate. A relationship "first high frame rate<second high frame rate" is established between the first high frame rate and the second high frame rate. Alternatively, for example, the high frame rate may be a frame rate higher than 240 fps like 400 fps, 480 fps, 800 fps, or 960 fps.

Figure 7:
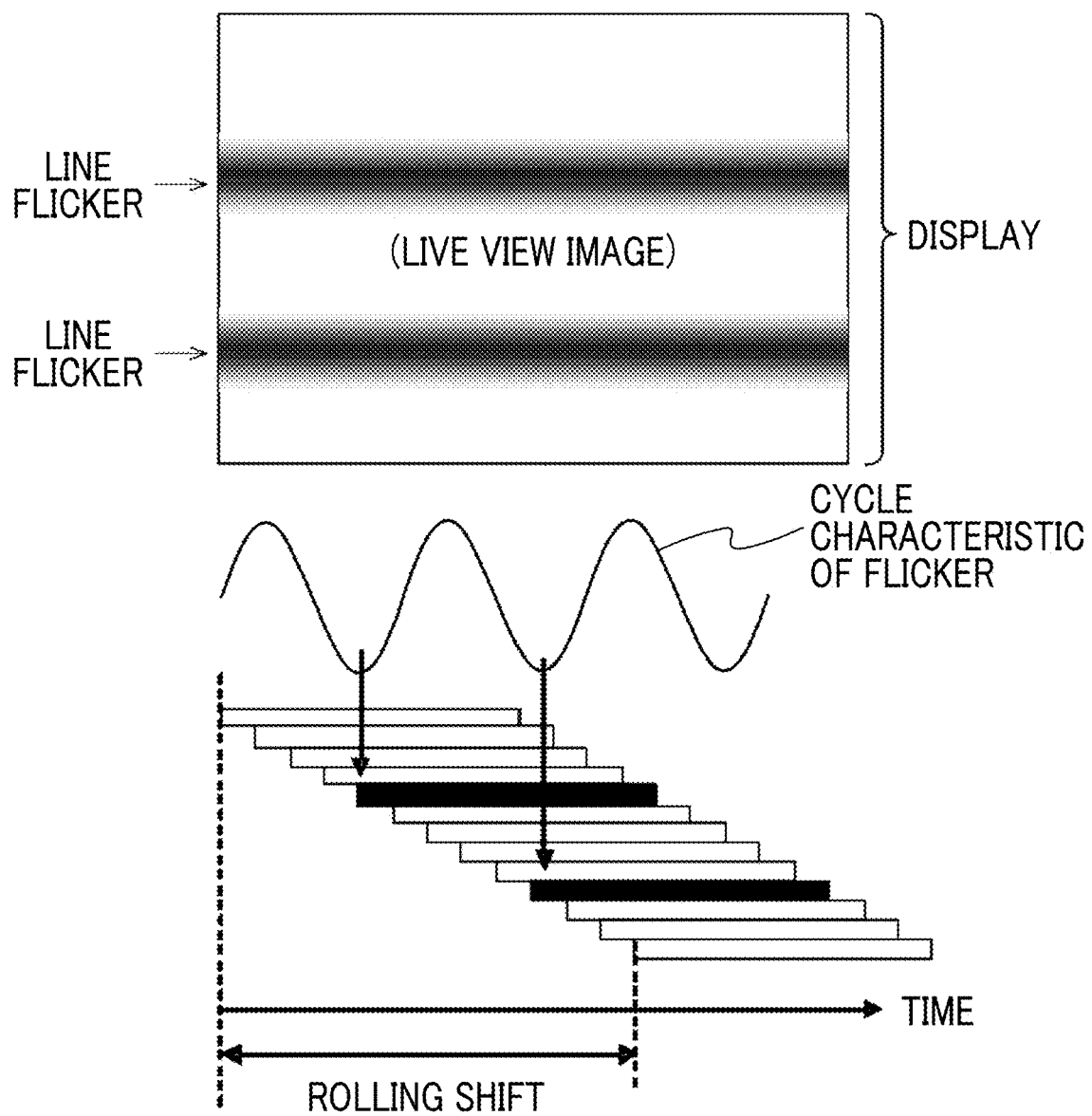
FIG. 7 is a conceptual diagram illustrating one example of a relationship between a rolling shift and a flicker cycle characteristic in an imaging apparatus according to a technology in the related art.
Figure 8:
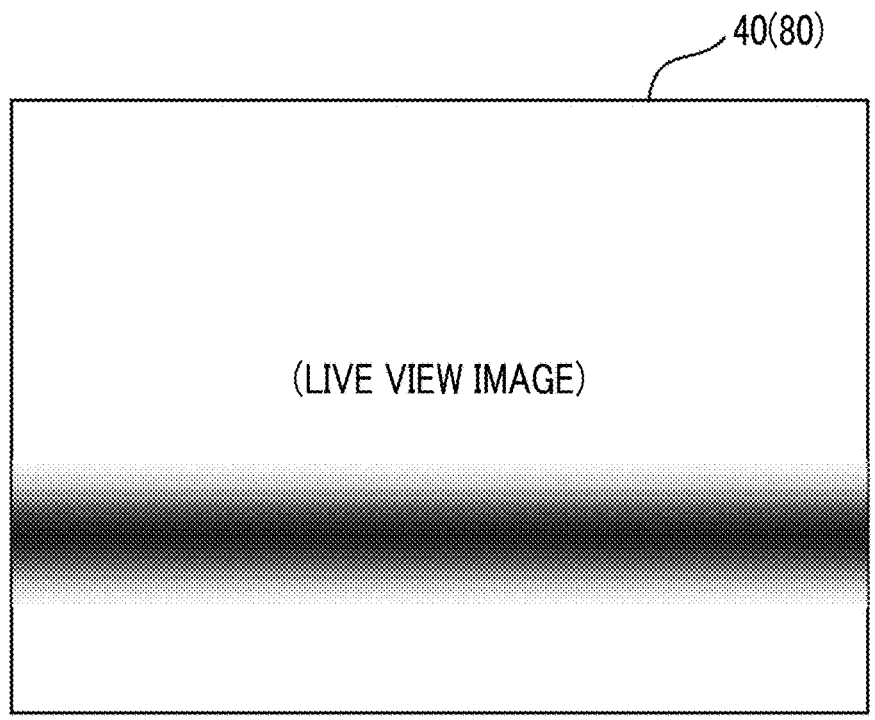
FIG. 8 is a conceptual diagram illustrating one example of a relationship between a rolling shift and a flicker cycle characteristic in the imaging apparatus according to the embodiment.
Figure 8:
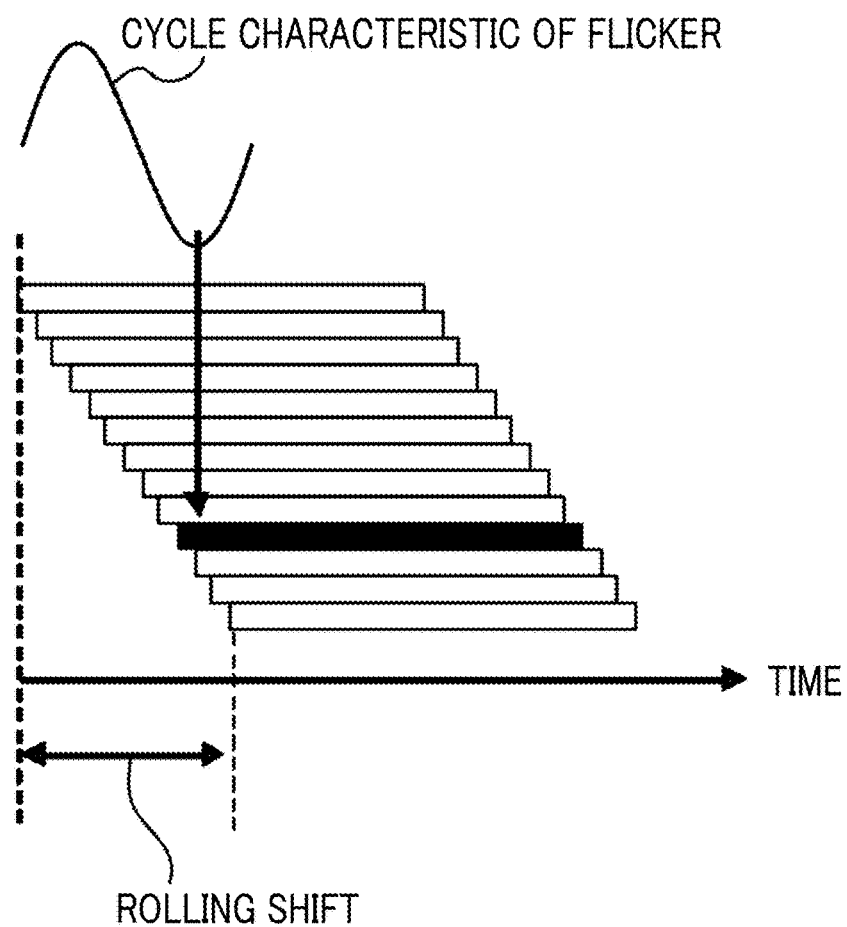

A flicker may be captured in the output image data obtained by imaging the subject by the imaging element 20. In a case where imaging using the rolling shutter method is performed, for example, a line flicker that is a linear flicker occurs as illustrated in FIG. 7 and FIG. 8. In FIG. 7, one example of a state where a live view image obtained by imaging a subject by an imaging apparatus according to a technology in the related art is displayed on a display is illustrated. In addition, in FIG. 8, one example of a state where the live view image obtained by imaging the subject by the imaging apparatus 10 is displayed on the display apparatus is illustrated.

The line flicker is a phenomenon that is caused by a rolling shift of the imaging apparatus 10 and flickering of a light source (hereinafter, referred to as a "flickering light source") that periodically flickers. In a case where the live view image is displayed on the display apparatus, the line flicker appears as flowing in the vertical direction. In the example illustrated in FIG. 7, two line flickers appear in the live view image. In the example illustrated in FIG. 8, the rolling shift is shorter than the example illustrated in FIG. 7, and thus, one line flicker appears in the live view image.

Figure 9:
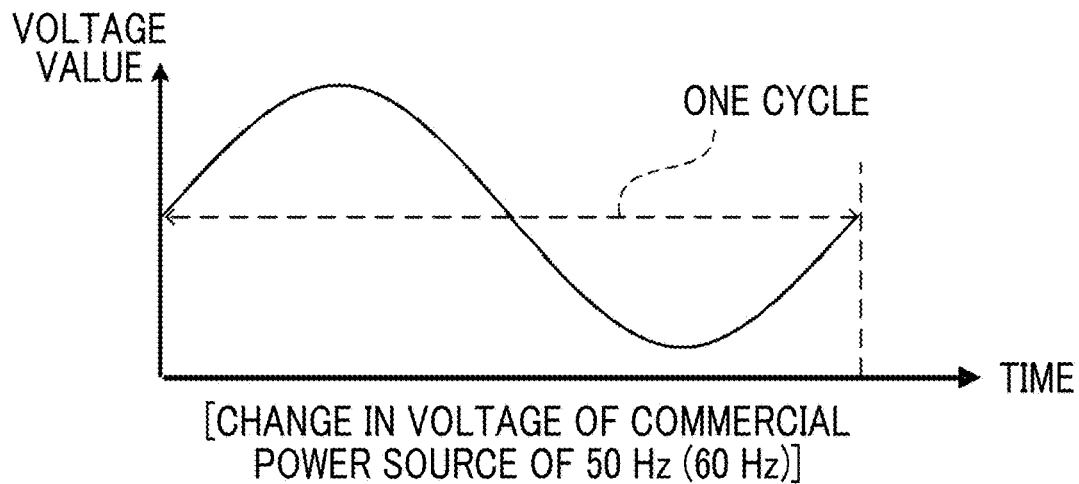
FIG. 9 is a graph illustrating one example of a change in voltage of a commercial power source of 50 Hz.
Figure 10:
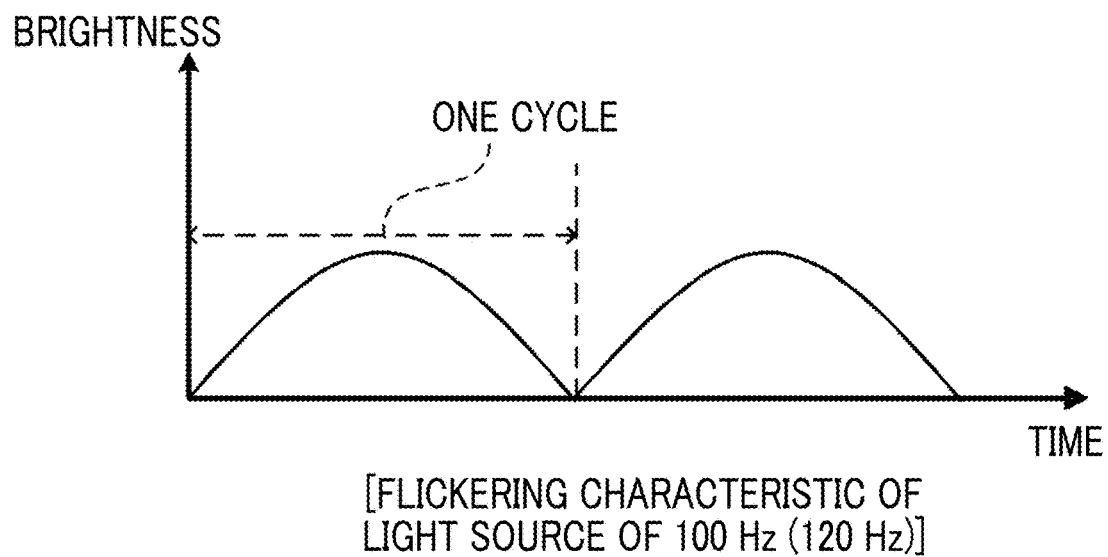
FIG. 10 is a graph illustrating one example of a flickering cycle characteristic of a flickering light source that flickers at a frequency of 100 Hz.

A fluorescent lamp is illustrated as one example of the flickering light source. In a case where alternating current electric power is supplied to the fluorescent lamp from a commercial power source, a flickering cycle of the fluorescent lamp is half of a voltage cycle of the commercial power source. For example, as illustrated in FIG. 9 and FIG. 10, in a case where a frequency of the commercial power source is 50 Hz, a flickering frequency of the fluorescent lamp is 100 Hz. In a case where the frequency of the commercial power source is 60 Hz, the flickering frequency of the fluorescent lamp is 120 Hz. While the fluorescent lamp is illustrated as the flickering light source, the flickering light source is not limited to the fluorescent lamp. For example, the flickering light source may be a light emitting diode (LED) used in a display connected to a personal computer or an illumination.

In the imaging apparatus 10, in order to implement imaging that does not capture the line flicker in the image indicated by the output image data, that is, imaging that avoids an effect of the line flicker, the processing circuit 94 determines the first frame rate in accordance with an occurrence cycle of the line flicker. That is, the processing circuit 94 changes the first frame rate from the low frame rate to the first high frame rate or the second high frame rate in accordance with the occurrence cycle (hereinafter, referred to as the "flicker occurrence cycle") of the line flicker.

The flicker occurrence cycle is a flickering cycle of the flickering light source. Thus, for example, in a case where imaging is performed in an environment receiving illumination of the fluorescent lamp, the flickering cycle of the fluorescent lamp is used as the flicker occurrence cycle by the processing circuit 94. For example, the flicker occurrence cycle used by the processing circuit 94 may be a variable value that is changed in accordance with an instruction received by the touch panel 42 and/or the operation portion 54, or may be a fixed value.

Figure 6:
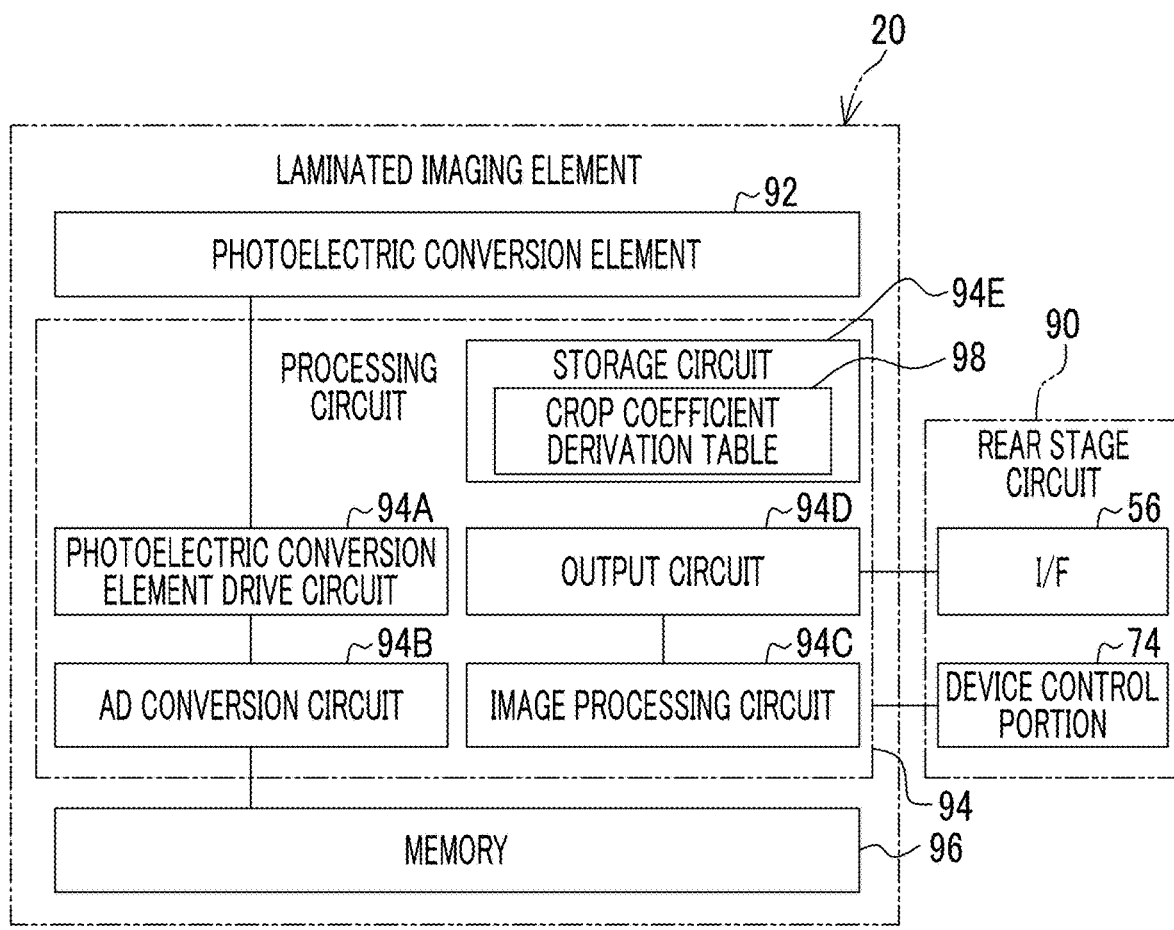
FIG. 6 is a block diagram illustrating one example of a main configuration of the imaging element included in the imaging apparatus according to the embodiment.

For example, as illustrated in FIG. 6, the processing circuit 94 includes a photoelectric conversion element drive circuit 94A, an analog-to-digital (AD) conversion circuit 94B, an image processing circuit 94C, an output circuit 94D, and a storage circuit 94E. The processing circuit 94 operates under control of the CPU 52 through the device control portion 74. The storage circuit 94E stores a crop coefficient derivation table 98. While details will be described later, the crop coefficient derivation table 98 is a table used in flicker avoidance imaging processing described later.

The photoelectric conversion element drive circuit 94A is connected to the photoelectric conversion element 92 and the AD conversion circuit 94B. The memory 96 is connected to the AD conversion circuit 94B and the image processing circuit 94C. The image processing circuit 94C is connected to the output circuit 94D. The output circuit 94D is connected to the I/F 56 of the rear stage circuit 90.

The photoelectric conversion element drive circuit 94A controls the photoelectric conversion element 92 and reads out analog captured image data from the photoelectric conversion element 92 under control of the device control portion 74. The AD conversion circuit 94B digitizes the captured image data read out by the photoelectric conversion element drive circuit 94A and stores the digitized captured image data in the memory 96. The memory 96 is a memory that can store the captured image data of a plurality of frames. The image processing circuit 94C performs processing on the captured image data.

In the imaging apparatus 10, in order to implement imaging that does not capture the line flicker in an image (hereinafter, referred to as a "captured image") indicated by the captured image data, a flicker effect avoidance timing is detected by the processing circuit 94. The flicker effect avoidance timing refers to a timing at which the effect of the line flicker on imaging performed by the imaging element 20 is avoided. In the present embodiment, a timing at which brightness of the captured image reaches a peak is employed as one example of the flicker effect avoidance timing. For example, the timing at which the brightness of the captured image reaches the peak refers to a timing at which a brightness difference between adjacent frames of the captured images is "0". The flicker effect avoidance timing may not necessarily be the timing at which the brightness of the captured image reaches the peak. In this case, for example, the flicker effect avoidance timing may be a timing away from the peak of the brightness of the captured image within a range in which the flicker does not appear in the captured image.

A difference between average brightness of the entire captured image of one frame and average brightness of the entire captured image of another frame is employed as the brightness difference. However, the technology of the present disclosure is not limited thereto. For example, the brightness difference may be a difference between average brightness of a partial region of the captured image of one frame and average brightness of a partial region of the captured image of the other frame.

Figure 11:
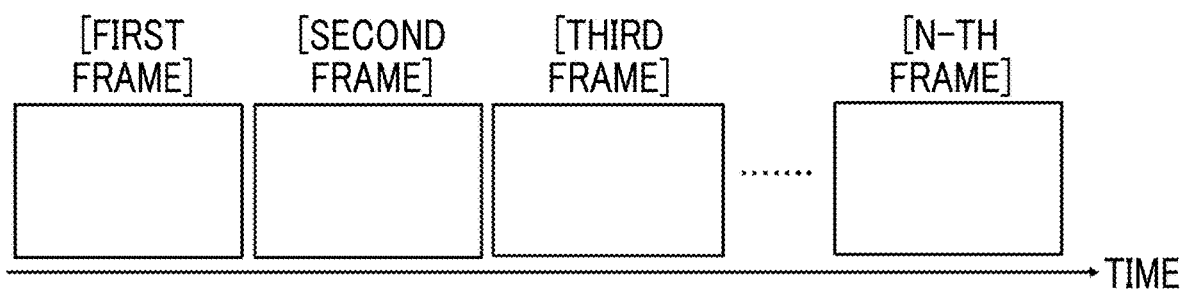
FIG. 11 is a conceptual diagram illustrating one example of captured images of a plurality of frames obtained by imaging a subject by the imaging apparatus according to the embodiment.

One example of a method of detecting the flicker effect avoidance timing will be described with reference to FIG. 11 and FIG. 12. In the example illustrated in FIG. 11, captured images of a first frame to an N-th frame are illustrated as one example of captured images of a plurality of frames obtained by imaging at the high frame rate. The first frame is the most recent frame, and the N-th frame is the least recent frame.

Figure 12:
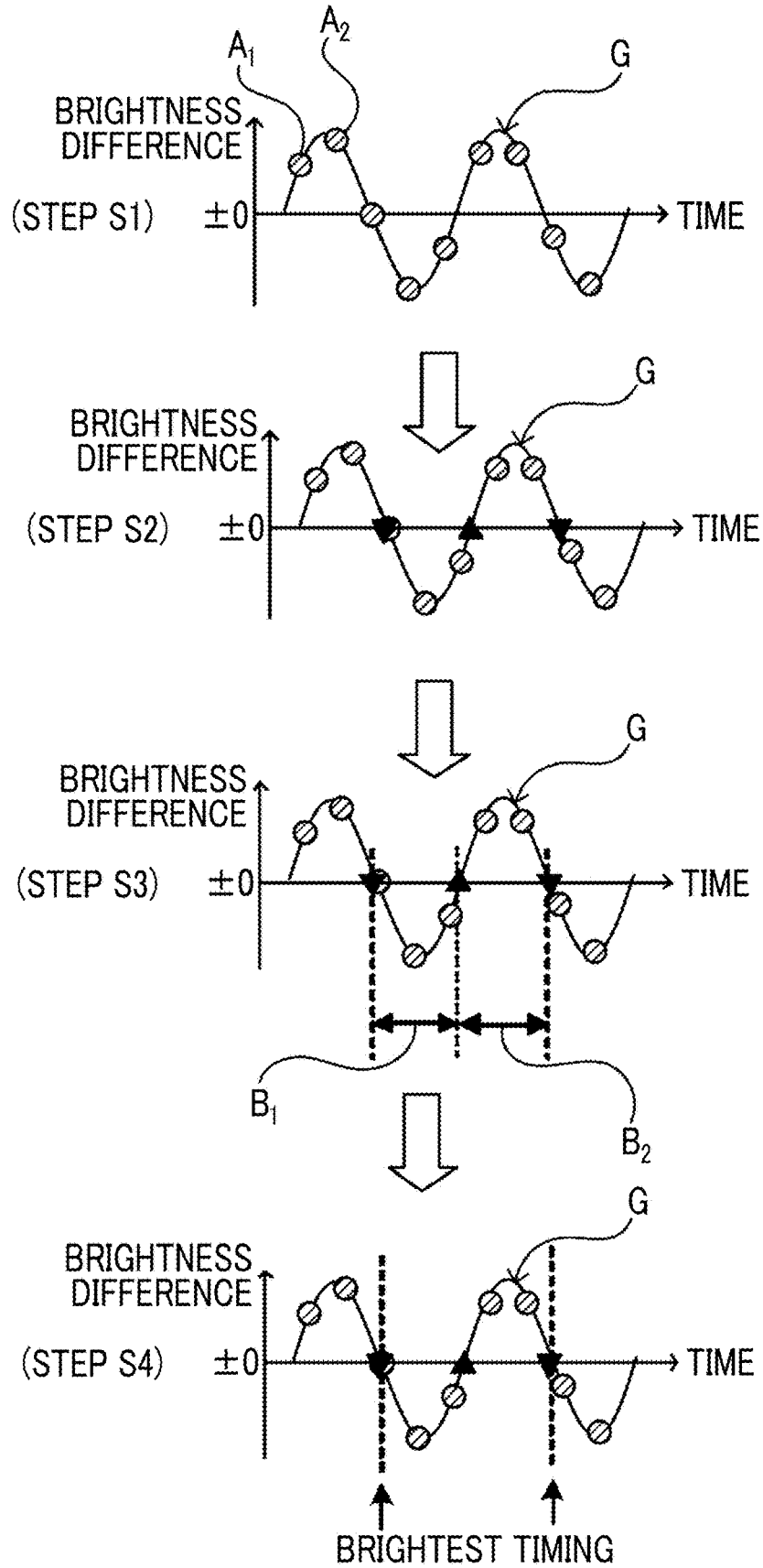
FIG. 12 is a descriptive diagram for describing one example of a method of detecting a flicker effect avoidance timing according to the embodiment.

For example, as illustrated in FIG. 12, a procedure of the method of detecting the flicker effect avoidance timing is divided into step S1 to step S4. First, in step S1, each time new captured image data is stored in the memory 96, the brightness difference between the most recent captured image data and the captured image data of the immediately previous frame is calculated, and a brightness difference cycle characteristic graph G that illustrates a cycle characteristic of the brightness difference is generated by plotting the calculated brightness difference in time series.

In the example illustrated in FIG. 12, a point $A_1$ is the brightness difference between the captured image data of the first frame and the captured image data of the second frame. A point $A_2$ is the brightness difference between the captured image data of the second frame and the captured image data of the third frame.

In step S2, a timing at which the brightness difference is "0" within a range in which the brightness difference changes from a negative value to a positive value, and a timing at which the brightness difference is "0" within a range in which the brightness difference changes from a positive value to a negative value are detected. In the example illustrated in FIG. 12, both of the brightness difference at a position of "□" and the brightness difference at a position of "□" on the brightness difference cycle characteristic graph G are "0". In addition, in the example illustrated in FIG. 12, the position of "□" indicates a position of a timing at which the brightness difference changes from a negative value to a positive value and the brightness difference is "0". The position of "□" indicates a position of a timing at which the brightness difference changes from a positive value to a negative value and the brightness difference is "0".

In other words, the position of "□" illustrated in FIG. 12 is a position at which the brightness difference is "0" within a range in which a differential coefficient of the brightness difference cycle characteristic graph G shows a positive value. The position of "□" illustrated in FIG. 12 is a position at which the brightness difference is "0" within a range in which the differential coefficient of the brightness difference cycle characteristic graph G shows a negative value.

In step S3, time intervals of the timing at which the brightness difference is "0" are detected. In the example illustrated in FIG. 12, a time interval $B_1$ and a time interval $B_2$ are detected. The time interval $B_1$ is a time interval from the position of "□" to the position of "□", and the time interval $B_2$ is a time interval from the position of "□" to the position of "□".

In step S4, the flicker effect avoidance timing is detected based on a detection result in step S2 and a detection result in step S3. In the example illustrated in FIG. 12, a timing at which the captured image is brightest, that is, a timing at which the brightness reaches the peak, in the brightness difference cycle characteristic graph G is the flicker effect avoidance timing. The position of "□" on the brightness difference cycle characteristic graph G is the flicker effect avoidance timing. The flicker effect avoidance timing, that is, the position of "□" on the brightness difference cycle characteristic graph G, appears in a constant cycle of "time interval $B_1$+time interval $B_2$".

Detection of the flicker effect avoidance timing is important for implementing imaging that avoids the effect of the line flicker. Therefore, in the imaging element 20, measurement and detection processing is executed by the processing circuit 94 at the same first frame rate as the first processing. In other words, processing executed by the processing circuit 94 includes the measurement and detection processing.

The measurement and detection processing refers to processing of measuring the brightness difference between the frames of the captured image data and detecting the flicker effect avoidance timing based on the measured brightness difference. A series of processing illustrated in step S1 to step S3 in FIG. 12 is illustrated as one example of the measurement and detection processing.

Detection of the flicker effect avoidance timing is implemented on an assumption that the brightness difference cycle characteristic graph G is created. In order to increase detection accuracy of the flicker effect avoidance timing, it is necessary to increase accuracy of the brightness difference cycle characteristic graph G. In order to increase the accuracy of the brightness difference cycle characteristic graph G, it is necessary to increase a sampling frequency (=number of measurements of brightness difference/1 second) of the brightness difference in step S1. However, in order for an imaging element in the related to implement sampling of the brightness difference illustrated in FIG. 12, it is necessary to thin the captured image data. Thus, accuracy of the brightness difference is decreased in accordance with thinning. In a case where the accuracy of the brightness difference is decreased, the flicker effect avoidance timing is likely to be erroneously detected. Meanwhile, the imaging element 20 can secure the sampling frequency necessary for detecting the flicker effect avoidance timing without thinning the captured image data.

In order to secure the detection accuracy of the flicker effect avoidance timing, it is important to accurately determine the sampling frequency. In addition, from a viewpoint of reducing electric power consumption, it is preferable to accurately determine the sampling frequency.

The sampling frequency is uniquely determined by the first frame rate. Therefore, in the imaging element 20, the processing circuit 94 determines the first frame rate in accordance with the flicker occurrence cycle.

In addition, for example, in a case where the measurement and detection processing is executed by the processing circuit 94 during a period from setting of the release button 25 to the full push state until a start of imaging, it is more desirable as a processing time period required for processing of the measurement and detection processing (hereinafter, simply referred to as the "processing time period") is shortened. Shortening of the processing time period means shortening of a time lag from setting of the full push state until the start of imaging.

In the present embodiment, a minimum time period necessary for detecting the position at which the brightness difference is "0" three times is employed as one example of the processing time period. For example, as illustrated in FIG. 12, the minimum time period necessary for detecting the position at which the brightness difference is "0" three times means a minimum time period necessary for detecting the position of "□" twice.

While the minimum time period necessary for detecting the position at which the brightness difference is "0" three times is employed as the processing time period in the present embodiment, the technology of the present disclosure is not limited thereto. For example, the processing time period may be a minimum time period necessary for detecting the position at which the brightness difference is "0" twice. For example, the minimum time period necessary for detecting the position at which the brightness difference is "0" twice refers to a minimum time period necessary for detecting the time interval $B_1$ illustrated in step S3 in FIG. 12. In a case where the brightness difference is regarded as being "0" at the same time interval as the time interval $B_1$ after the time interval $B_1$ is detected, the flicker effect avoidance timing is specified in the same manner as in a case where the position at which the brightness difference is "0" is detected three times.

The processing circuit 94 determines the processing time period in accordance with the flicker occurrence cycle. For example, in a case where imaging is performed in an environment in which the flickering light source having a flickering frequency of 100 Hz flickers, the processing circuit 94 sets the first high frame rate as the high frame rate of the first frame rate. In the present embodiment, 200 fps is employed as one example of the first high frame rate. In this case, the processing circuit 94 sets 30 ms (=10 ms (=$\frac{1}{100}$ Hz)×3) as the processing time period. Here, "3" refers to the number of positions at which the brightness difference is "0".

In addition, for example, in a case where imaging is performed in an environment in which the flickering light source having a flickering frequency of 120 Hz flickers, the processing circuit 94 sets the first frame rate to the second high frame rate. In the present embodiment, 240 fps is employed as one example of the second high frame rate. In this case, the processing circuit 94 sets 25 ms (=8.33 ms (=$\frac{1}{120}$ Hz)×3) as the processing time period. Here, "3" refers to the number of positions at which the brightness difference is "0".

The processing time periods of 30 ms and 25 ms are minimum processing time periods, and a longer processing time period may be used. In a case where a motion of the subject or a camera shake or the like is considered, there is a possibility that the processing time periods of 30 ms and 25 ms are not sufficient for detecting the position at which the brightness difference is "0" three times. In this case, for example, the processing circuit 94 may detect the motion of the subject or a degree of the camera shake and add a necessary time period to the processing time periods of 30 ms and 25 ms in accordance with a detection result.

Figure 13:
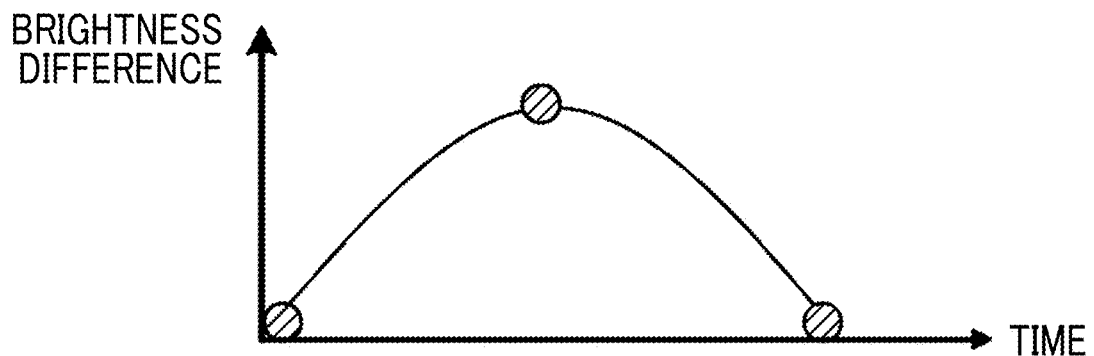
FIG. 13 is a conceptual diagram illustrating one example of an aspect where a brightness difference is sampled in a case where a sampling frequency is 200 Hz.
Figure 14:
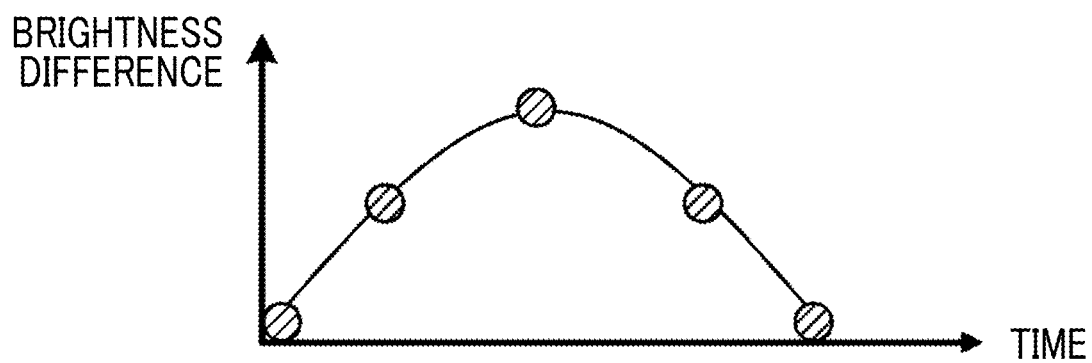
FIG. 14 is a conceptual diagram illustrating one example of an aspect where the brightness difference is sampled in a case where the sampling frequency is 400 Hz.
Figure 15:
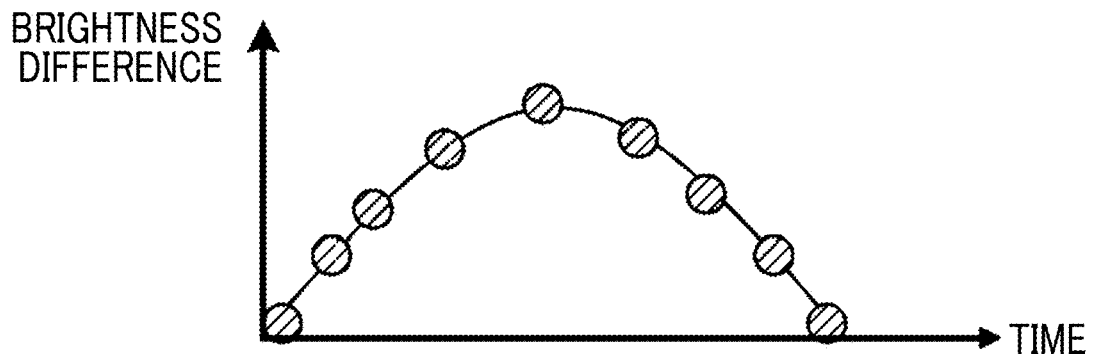
FIG. 15 is a conceptual diagram illustrating one example of an aspect where the brightness difference is sampled in a case where the sampling frequency is 800 Hz.

In addition, in order to increase the accuracy of the brightness difference cycle characteristic graph G, it is desirable to increase the sampling frequency. For example, in a case where the sampling frequency is 200 Hz, for example, as illustrated in FIG. 13, the brightness difference is measured three times in one cycle of the flickering light source. In addition, for example, in a case where the sampling frequency is 400 Hz, for example, as illustrated in FIG. 14, the brightness difference is measured five times in one cycle of the flickering light source. Furthermore, for example, in a case where the sampling frequency is 800 Hz, for example, as illustrated in FIG. 15, the brightness difference is measured nine times in one cycle of the flickering light source.

Next, actions of parts of the imaging apparatus 10 according to the embodiment of the technology of the present disclosure will be described.

In a case where an instruction to start the imaging processing is received by the operation portion 54, the CPU 52 executes the imaging processing in accordance with the imaging program 60A. Hereinafter, the imaging processing executed by the CPU 52 will be described with reference to FIG. 16. Hereinafter, for convenience of description, a case where the flickering light source is the fluorescent lamp, the subject is imaged by the imaging apparatus 10 under illumination of only the fluorescent lamp, and the still picture image showing the subject is acquired will be described. In addition, in the following description, for convenience of description, both of the AF and the AE will be assumed to be executed in a case where the release button 25 is in the half push state.

Figure 16:
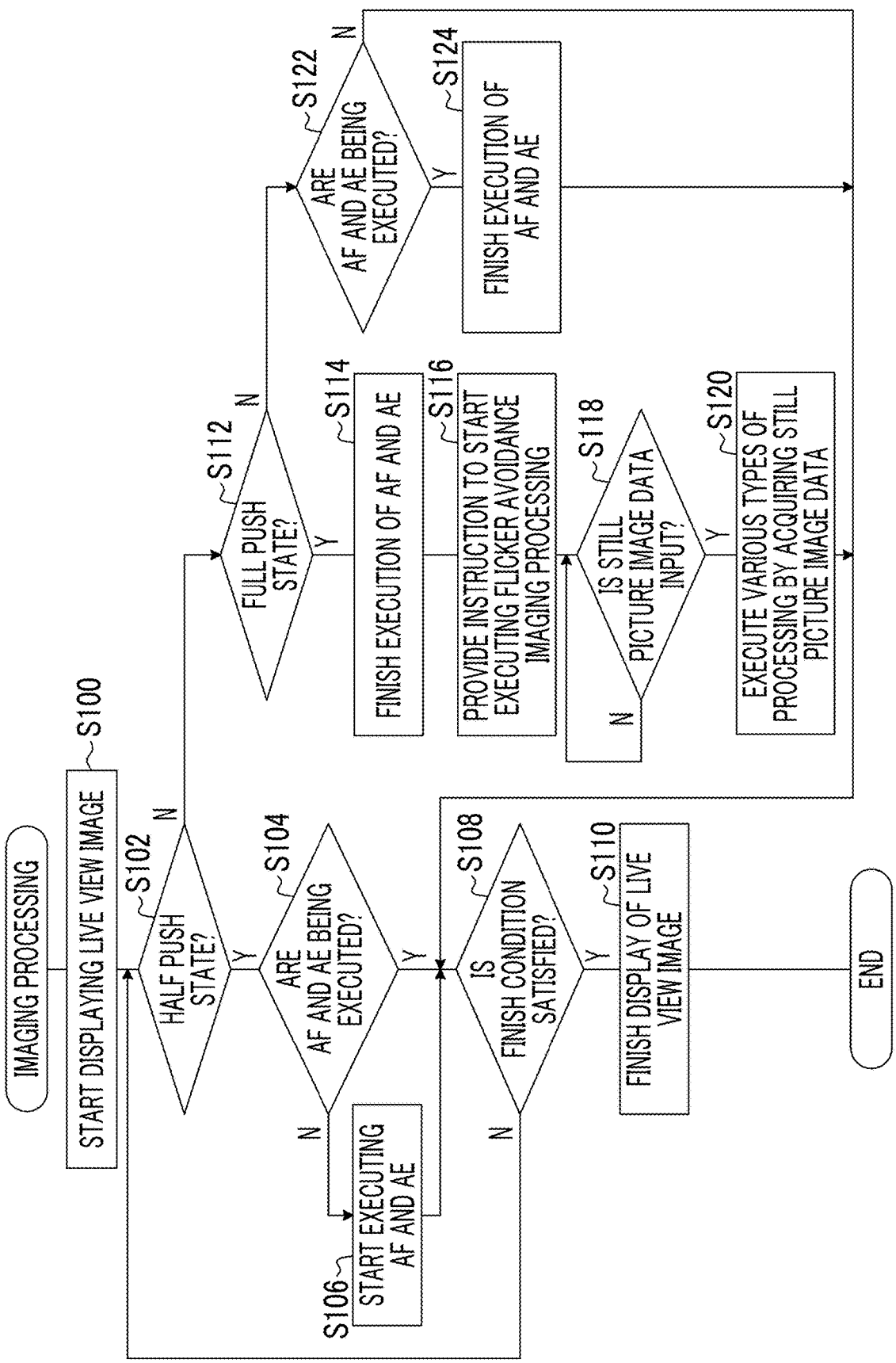
FIG. 16 is a flowchart illustrating one example of a flow of imaging processing according to the embodiment.

In the imaging processing illustrated in FIG. 16, first, in step S100, the CPU 52 starts displaying the live view image on the display apparatus by controlling the imaging element 20 and the display control portion, and then, transitions to step S102. In step S100, the CPU 52, the imaging element 20 starts imaging at the first frame rate, and the live view image obtained by imaging by the imaging element 20 is output to the display control portion. The display control portion displays the input live view image on the display apparatus.

In step S102, the CPU 52 determines whether or not the release button 25 is in the half push state. In step S102, in a case where the release button 25 is in the half push state, a positive determination is made, and the imaging processing transitions to step S104. In step S102, in a case where the release button 25 is not in the half push state, a negative determination is made, and the imaging processing transitions to step S112.

In step S104, the CPU 52 determines whether or not the AF and the AE are being executed. In step S104, in a case where the AF and the AE are not being executed, a negative determination is made, and the imaging processing transitions to step S106. In step S104, in a case where the AF and the AE are being executed, a positive determination is made, and the imaging processing transitions to step S108.

In step S106, the CPU 52 starts executing the AF and the AE. Then, the imaging processing transitions to step S108.

In step S108, the CPU 52 determines whether or not an imaging processing finish condition that is a condition for finishing the imaging processing is satisfied. For example, a condition that an instruction to finish the imaging processing is received by the touch panel 42 and/or the operation portion 54 is illustrated as the imaging processing finish condition. Alternatively, for example, a condition that a time period in which a positive determination is not made in step S112 after a start of the imaging processing exceeds a predetermined time period is illustrated as the imaging processing finish condition. For example, the "predetermined time period" here is five minutes. The predetermined time period may be a fixed value or a variable value that can be changed in accordance with an instruction provided from the user.

In step S108, in a case where the imaging processing finish condition is satisfied, a positive determination is made, and the imaging processing transitions to step S110. In step S108, in a case where the imaging processing finish condition is not satisfied, a negative determination is made, and the imaging processing transitions to step S102.

In step S112, the CPU 52 determines whether or not the release button 25 is in the full push state. In step S112, in a case where the release button 25 is in the full push state, a positive determination is made, and the imaging processing transitions to step S114. In step S112, in a case where the release button 25 is not in the full push state, that is, in a case where the release button 25 is not pushed, a negative determination is made, and the imaging processing transitions to step S122.

In step S122, the CPU 52 determines whether or not the AF and the AE are being executed. In step S122, in a case where the AF and the AE are not being executed, a negative determination is made, and the imaging processing transitions to step S108. In step S122, in a case where the AF and the AE are being executed, a positive determination is made, and the imaging processing transitions to step S124.

In step S124, the CPU 52 finishes execution of the AF and the AE. Then, the imaging processing transitions to step S108.

In step S114, the CPU 52 finishes execution of the AF and the AE. Then, the imaging processing transitions to step S116.

In step S116, the CPU 52 instructs the imaging element 20 to start executing the flicker avoidance imaging processing. Then, the imaging processing transitions to step S118.

In a case where executing processing of step S116 by the CPU 52 instructs the imaging element 20 to start executing the flicker avoidance imaging processing, the processing circuit 94 of the imaging element 20 executes the flicker avoidance imaging processing.

The flicker avoidance imaging processing executed by the processing circuit 94 will be described with reference to FIG. 17. In the following description, for convenience of description, the flicker avoidance imaging processing will be assumed to be started in a state where the low frame rate is employed as the first frame rate.

Figure 17:
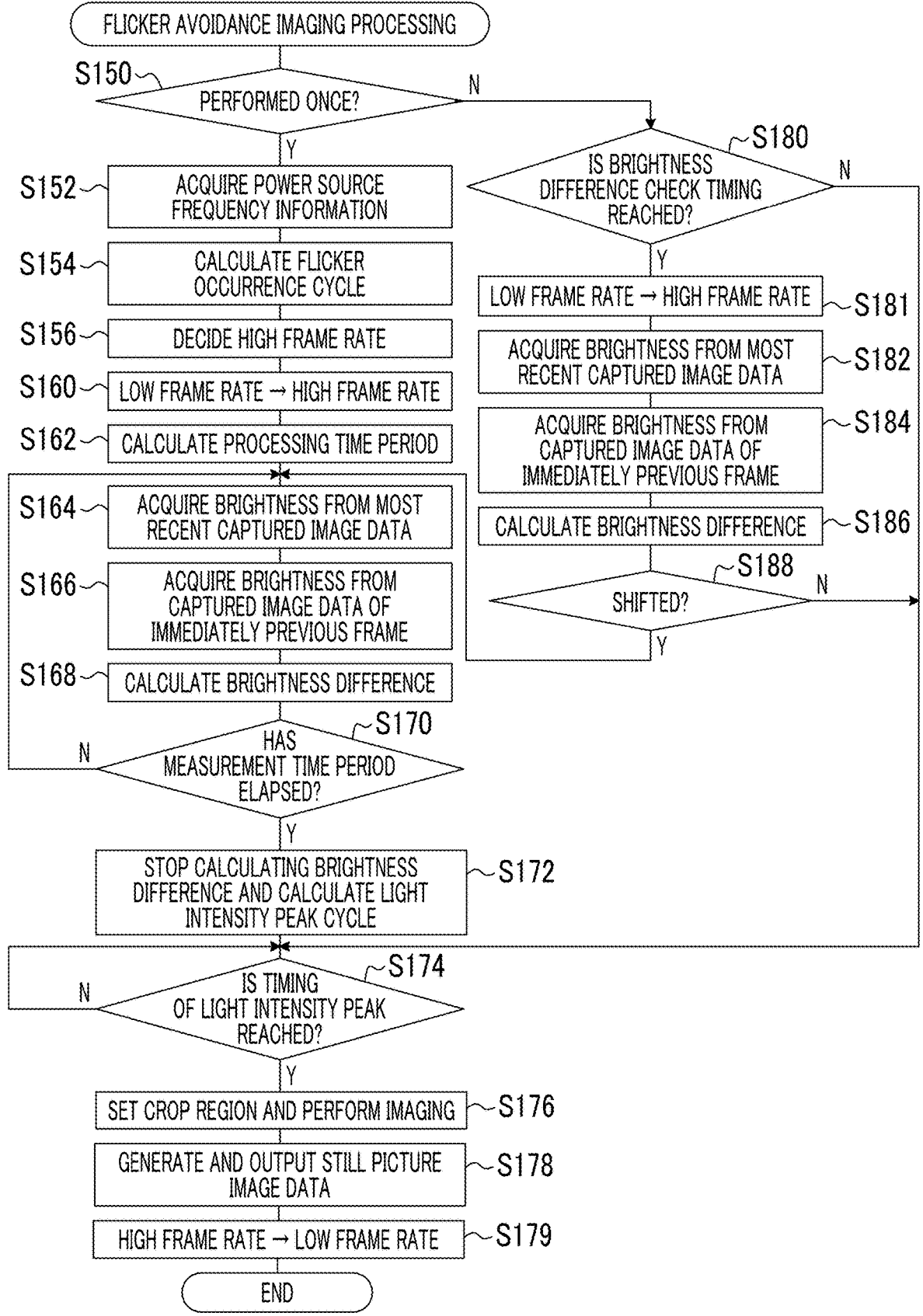
FIG. 17 is a flowchart illustrating one example of a flow of flicker avoidance imaging processing according to the embodiment.

In the flicker avoidance imaging processing illustrated in FIG. 17, first, in step S150, the processing circuit 94 determines whether or not the flicker avoidance imaging processing is executed once after execution of the imaging processing illustrated in FIG. 16 is started. In other words, the processing circuit 94 determines whether or not the flicker avoidance imaging processing is executed for the first time after execution of the imaging processing illustrated in FIG. 16 is started.

In step S150, in a case where the flicker avoidance imaging processing is executed once after execution of the imaging processing illustrated in FIG. 16 is started, a positive determination is made, and the flicker avoidance imaging processing transitions to step S152. In step S150, in a case where the flicker avoidance imaging processing is not executed once, that is, executed twice or more, after execution of the imaging processing illustrated in FIG. 16 is started, a negative determination is made, and the flicker avoidance imaging processing transitions to step S180.

In step S152, the processing circuit 94 acquires power source frequency information. Then, the flicker avoidance imaging processing transitions to step S154. The power source frequency information refers to information that indicates the frequency of the commercial power source used as a supply source of electric power supplied to the fluorescent lamp. For example, the power source frequency information is received by the touch panel 52 and/or the operation portion 54 and is acquired by the processing circuit 94 through the CPU 52 and the device control portion 74.

In step S154, the processing circuit 94 calculates the flicker occurrence cycle based on the power source frequency information acquired in step S152. Then, the flicker avoidance imaging processing transitions to step S156. In step S154, for example, in a case where the frequency indicated by the power source frequency information is 50 Hz, 10 ms is calculated as the flicker occurrence cycle. In a case where the frequency indicated by the power source frequency information is 60 Hz, 8.33 ms is calculated as the flicker occurrence cycle.

In step S156, the processing circuit 94 decides the high frame rate of the first frame rate in accordance with the flicker occurrence cycle calculated in step S154. That is, the processing circuit 94 decides any of the first high frame rate and the second high frame rate as the high frame rate of the first frame rate.

In step S156, in a case where the flicker occurrence cycle calculated in step S154 is 10 ms, the high frame rate of the first frame rate is decided to be the first high frame rate out of the first high frame rate and the second high frame rate. In addition, in a case where the flicker occurrence cycle calculated in step S154 is 8.33 ms, the high frame rate of the first frame rate is decided to be the second high frame rate out of the first high frame rate and the second high frame rate.

In subsequent step S160, the processing circuit 94 changes the first frame rate from the low frame rate to the high frame rate decided in step S156. Then, the flicker avoidance imaging processing transitions to step S162.

In step S162, the processing circuit 94 calculates the processing time period. Then, the flicker avoidance imaging processing transitions to step S164.

In step S164, the image processing circuit 94C acquires brightness from the most recent captured image data stored in the memory 96, and then, transitions to step S166. The "most recent captured image data" is one example of "second captured image data" according to the embodiment of the technology of the present disclosure.

In step S166, the image processing circuit 94C acquires brightness from the captured image data of the immediately previous frame of the most recent captured image data among the plurality of frames of the captured image data stored in the memory 96. Then, the flicker avoidance imaging processing transitions to step S168. The "captured image data of the immediately previous frame of the most recent captured image data" is one example of "first captured image data" according to the embodiment of the technology of the present disclosure.

In step S168, the image processing circuit 94C calculates the brightness difference. Then, the flicker avoidance imaging processing transitions to step S170. The brightness difference calculated by executing processing of step S168 is a subtraction result of subtracting the brightness acquired in step S164 from the brightness acquired in step S166. Thus, in a case of "brightness acquired in step S166>brightness acquired in step S164", the brightness difference is a positive value. In a case of "brightness acquired in step S166<brightness acquired in step S164", the brightness difference is a negative value. In a case of "brightness acquired in step S166=brightness acquired in step S164", the brightness difference is "0".

In step S170, the image processing circuit 94C determines whether or not the processing time period calculated in step S162 has elapsed after execution of step S162 is finished. In step S170, in a case where the processing time period calculated in step S162 has not elapsed, a negative determination is made, and the flicker avoidance imaging processing transitions to step S164. In step S170, in a case where the processing time period calculated in step S162 has elapsed, a positive determination is made, and the flicker avoidance imaging processing transitions to step S172.

In step S172, the image processing circuit 94C stops calculating the brightness difference and calculates a light intensity peak cycle, and then, transitions to step S174. A light intensity peak means the peak of the brightness of the captured image. The light intensity peak cycle refers to a cycle of defining the flicker effect avoidance timing. In the example illustrated in FIG. 12, a time period of "time interval $B_1$+time interval $B_2$" in step S3 corresponds to one cycle of the light intensity peak cycle.

Figure 18:
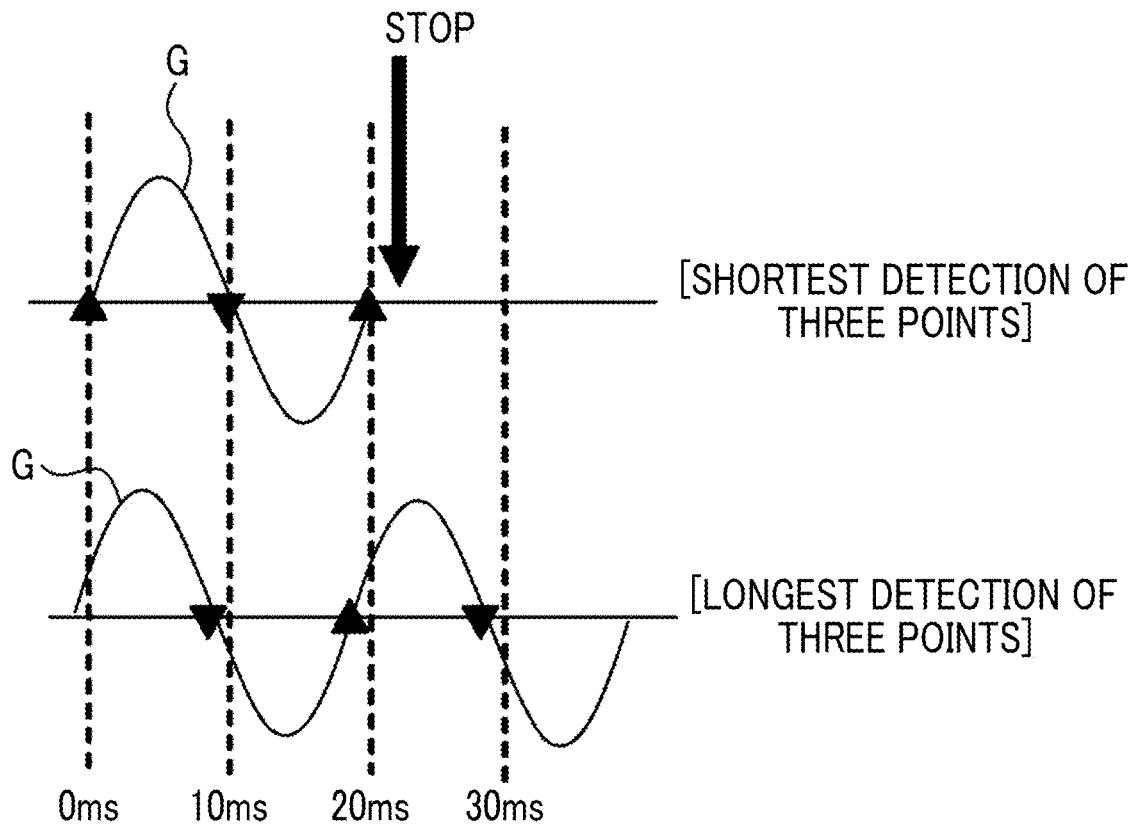
FIG. 18 is a descriptive diagram for describing a timing of stopping measurement and detection processing according to the embodiment.

In step S172, stopping calculation of the brightness difference means stopping the measurement and detection processing on a condition that the brightness difference changes from a positive value to a negative value twice. For example, as illustrated in FIG. 18, in a case where three points of the position at which the brightness difference is "0" in the brightness difference cycle characteristic graph G are detected, calculation of the brightness difference is stopped. In the example illustrated in FIG. 18, one example in which three points of the position at which the brightness difference is "0" are detected in a shortest period, and one example in which three points of the position at which the brightness difference is "0" are detected in a longest period are illustrated. In addition, in the example illustrated in FIG. 18, the light intensity peak cycle is defined by a time interval between two positions of "□".

Figure 21:
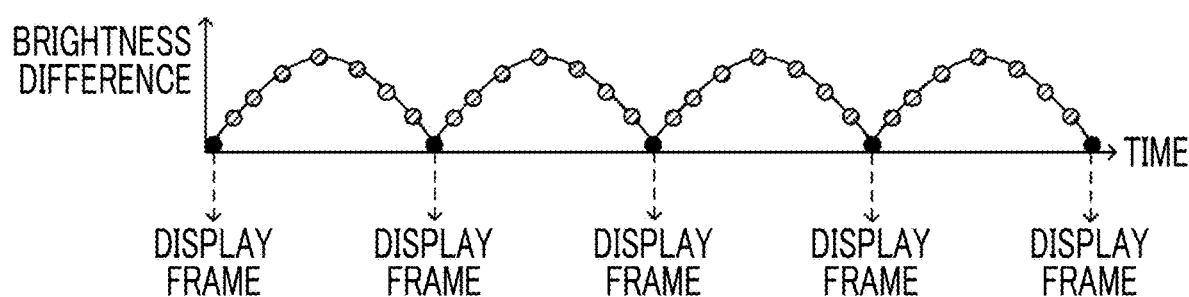
FIG. 21 is a conceptual diagram illustrating one example of an aspect where a display frame is output in accordance with a timing of a light intensity peak.

For example, as illustrated in FIG. 21, in a case where the light intensity peak cycle is calculated by executing processing of step S172, a display frame is then output to the rear stage circuit 90 from the output circuit 94D in accordance with the most recent light intensity peak cycle calculated in step S172. In a case where the display frame is output to the rear stage circuit 90 from the output circuit 94D, the display frame is displayed on the display apparatus as the live view image under control of the CPU 52. The "display frame" here refers to the output image data for the live view image obtained by processing the captured image data read out from the memory 96 by the image processing circuit 94C.

In step S174, the processing circuit 94 determines whether or not a timing of a light intensity peak of the captured image is reached based on the light intensity peak cycle calculated in step S172. The "timing of the light intensity peak of the captured image" here is one example of a "flicker effect avoidance timing" according to the embodiment of the technology of the present disclosure.

In step S174, in a case where the timing of the light intensity peak of the captured image is not reached, a negative determination is made, and the determination of step S174 is performed again. In step S174, in a case where the timing of the light intensity peak of the captured image is reached, a positive determination is made, and the flicker avoidance imaging processing transitions to step S176.

Figure 19:
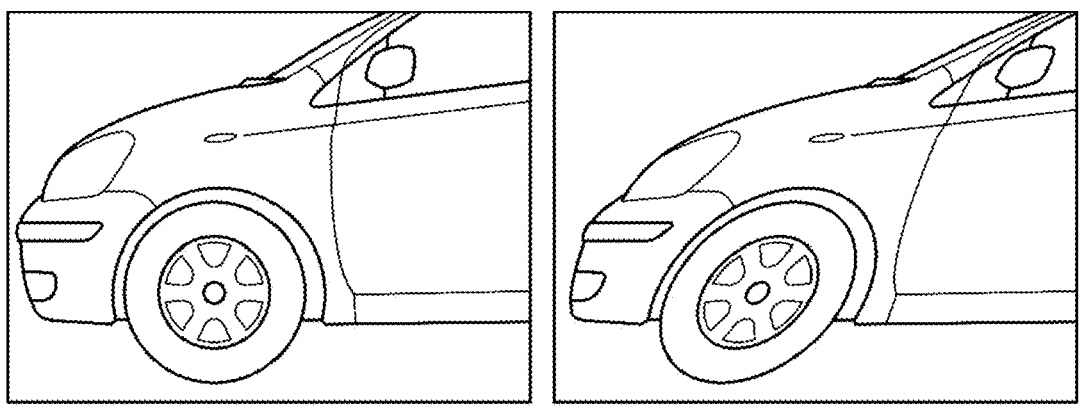
FIG. 19 is a image diagram illustrating one example of a captured image obtained by performing imaging using a mechanical shutter and one example of a captured image obtained by performing imaging using an electronic shutter.
Figure 20:
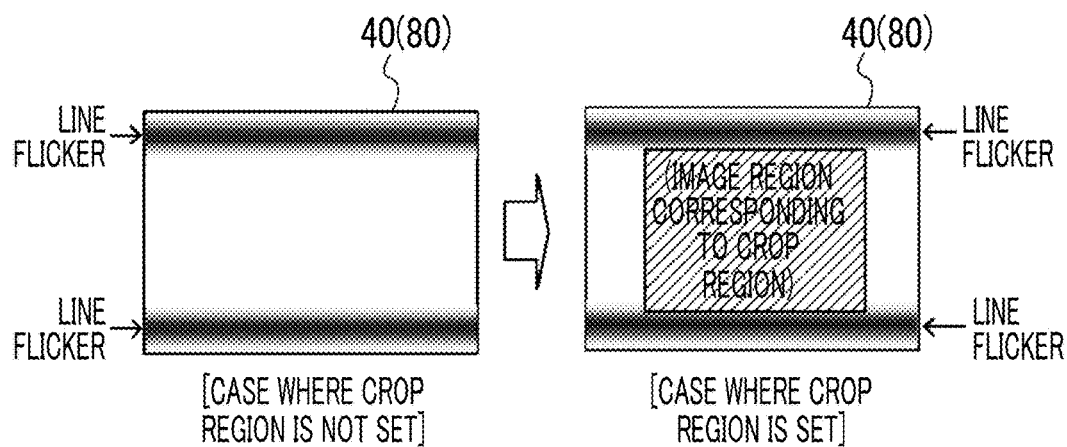
FIG. 20 is a conceptual diagram illustrating one example of a positional relationship between an image region and a line flicker in a case where a crop region is set.

For example, as illustrated in FIG. 19, an effect of a rolling shift of an electronic shutter is generally known to be greater than an effect of a rolling shift of a mechanical shutter. Thus, even in the imaging element 20, in a case of "time period of rolling shift of electronic shutter>time period of rolling shift of mechanical shutter 72", for example, as illustrated in FIG. 20, two line flickers may appear in a screen of the display apparatus. The same applies to a case of "flicker occurrence cycle≈time period of rolling shift".

Therefore, in step S176, the photoelectric conversion element drive circuit 94A sets a crop region based on the flicker effect avoidance timing. The photoelectric conversion element drive circuit 94A images the subject in the set crop region in the imaging region of the photoelectric conversion element 92, and then, transitions to step S178. In the present embodiment, the output image data based on the captured image data obtained by imaging by executing processing of step S176 is still picture image data. However, the technology of the present disclosure is not limited thereto. For example, the output image data based on the captured image data obtained by imaging by executing processing of step S176 can apparently be used as motion picture image data for recording.

The crop region is determined by a crop coefficient that is determined in accordance with the flicker effect avoidance timing. In step S176, the crop coefficient is derived from the crop coefficient derivation table 98 stored in the storage circuit 94E. The crop coefficient derivation table 98 is a table in which the light intensity peak cycle and the crop coefficient are associated. The crop coefficient of the crop coefficient derivation table 98 is a factor that defines the imaging region avoiding the effect of the line flicker in the imaging region of the photoelectric conversion element 92.

The processing circuit 94 derives the crop coefficient corresponding to the light intensity peak cycle calculated in step S172 from the crop coefficient derivation table 98. The photoelectric conversion element drive circuit 94A sets the crop region avoiding the effect of the line flicker in accordance with the crop coefficient derived from the crop coefficient derivation table 98, and images the subject in the set crop region. By executing processing of step S176, for example, as illustrated in FIG. 20, the image region corresponding to the crop region is positioned between line flickers on the display apparatus, and capturing of the line flicker on the screen is suppressed.

That is, by executing processing of step S176, the subject is imaged at a timing avoiding an occurrence timing of the line flicker in the crop region in which the line flicker does not appear on the display apparatus.

In step S178, the processing circuit 94 generates the still picture image data based on the captured image data obtained by imaging in step S176 and outputs the generated still picture image data to the rear stage circuit 90. The imaging processing transitions to step S179. That is, in step S178, the photoelectric conversion element drive circuit 94A outputs the captured image data obtained by imaging in the crop region in the imaging region of the photoelectric conversion element 92 to the AD conversion circuit 94B. The AD conversion circuit 94B digitizes the input captured image data and stores the captured image data in the memory 96. The image processing circuit 94C reads out the captured image data from the memory 96, generates the still picture image data by processing the read captured image data, and outputs the generated still picture image data to the output circuit 94D. The output circuit 94D outputs the output image data to the I/F 56 of the rear stage circuit 90 at the second frame rate. The still picture image data is one example of "output image data" according to the embodiment of the technology of the present disclosure.

In step S179, the processing circuit 94 changes the first frame rate from the high frame rate to the low frame rate, and then, finishes the flicker avoidance imaging processing.

Figure 23:
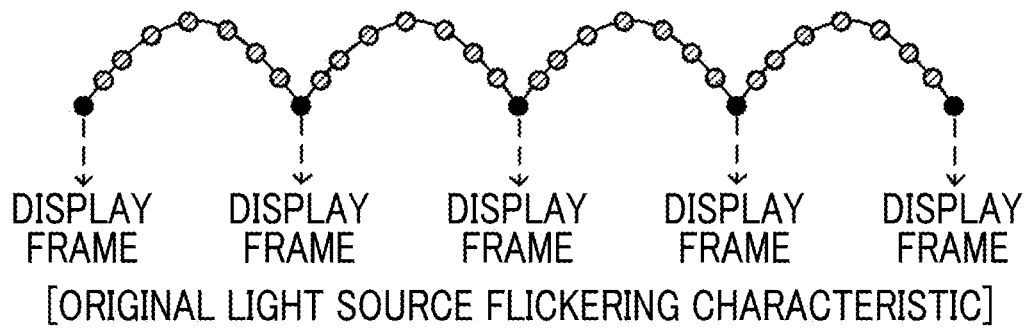
FIG. 23 is a conceptual diagram illustrating one example of a relationship between an original flickering cycle characteristic of a flickering light source and the flickering cycle characteristic of the flickering light source after a few hours.
Figure 23:
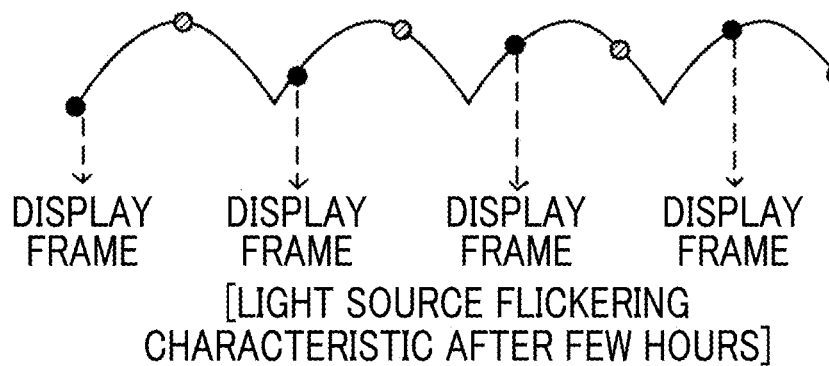

A clock of the imaging apparatus 10 is shifted by receiving an effect of a change in temperature. Thus, there may be a shift between the actual flicker occurrence cycle based on the frequency of the commercial power source and the light intensity peak cycle calculated in step S172. That is, for example, as illustrated in FIG. 23, a light source flickering characteristic that is a characteristic of the flickering light source may vary after a few hours. In a case where the display frame output from the imaging element 20 is displayed on the display apparatus as the live view image regardless of a shift in light source flickering characteristic, the line flicker may appear.

Therefore, in step S180, the processing circuit 94 determines whether or not a brightness difference check timing is reached. The brightness difference check timing refers to a predetermined timing as a timing of checking whether or not the current brightness difference deviates from the brightness difference cycle characteristic graph G based on the brightness difference obtained by previously executing processing of step S164 to step S170.

The predetermined timing refers to a timing that is derived in advance, by experiment using an actual apparatus and/or computer simulation or the like, as a timing at which the line flicker appears on the screen of the display apparatus due to the shift in clock of the imaging apparatus 10 by receiving the effect of the change in temperature. For example, a timing at which a first predetermined time period (for example, 30 minutes) has elapsed from previous execution of processing of step S168, or a timing at which a second predetermined time period (for example, 1 hour) has elapsed from switching ON of a power source of the imaging apparatus 10 is illustrated as the brightness difference check timing.

In step S180, in a case where the brightness difference check timing is not reached, a negative determination is made, and the flicker avoidance imaging processing transitions to step S174. In step S180, in a case where the brightness difference check timing is reached, a positive determination is made, and the flicker avoidance imaging processing transitions to step S181. A case where the brightness difference check timing is reached is one example of a "case where a predetermined condition is satisfied" according to the embodiment of the technology of the present disclosure.

In step S181, the processing circuit 94 changes the first frame rate from the low frame rate to the high frame rate decided in step S156. Then, the flicker avoidance imaging processing transitions to step S182.

In step S182, the image processing circuit 94C acquires the brightness from the most recent captured image data stored in the memory, and then, transitions to step S184.

In step S184, the image processing circuit 94C acquires the brightness from the captured image data of the immediately previous frame of the most recent captured image data among the plurality of frames of the captured image data stored in the memory 96. Then, the flicker avoidance imaging processing transitions to step S186.

In step S186, the image processing circuit 94C calculates the brightness difference. Then, the flicker avoidance imaging processing transitions to step S188. The brightness difference calculated by executing processing of step S186 is a subtraction result of subtracting the brightness acquired in step S182 from the brightness acquired in step S184.

In step S188, the image processing circuit 94C determines whether or not the brightness difference calculated in step S186 is shifted from the brightness difference cycle characteristic graph G based on the brightness difference obtained by previously executing processing of step S164 to step S170.

In step S188, in a case where the brightness difference calculated in step S186 is not shifted from the brightness difference cycle characteristic graph G based on the brightness difference obtained by previously executing processing of step S164 to step S170, a negative determination is made, and the flicker avoidance imaging processing transitions to step S174. That is, a negative determination is made in a case where the brightness difference calculated in step S186 is not present on the brightness difference cycle characteristic graph G based on the brightness difference obtained by previously executing processing of step S164 to step S170.

In step S188, in a case where the brightness difference calculated in step S186 is shifted from the brightness difference cycle characteristic graph G based on the brightness difference obtained by previously executing processing of step S164 to step S170, a positive determination is made, and the flicker avoidance imaging processing transitions to step S164. That is, a positive determination is made in a case where the brightness difference calculated in step S186 is present on the brightness difference cycle characteristic graph G based on the brightness difference obtained by previously executing processing of step S164 to step S170.

In the imaging processing illustrated in FIG. 16, in step S118, the CPU 52 determines whether or not the still picture image data output from the output circuit 94D by executing processing of step S178 of the flicker avoidance imaging processing illustrated in FIG. 17 is input into the I/F 56 of the rear stage circuit 90. In step S118, in a case where the still picture image data is not input into the I/F 56 of the rear stage circuit 90, a negative determination is made, and the determination of step S118 is performed again. In step S118, in a case where the still picture image data is input into the I/F 56 of the rear stage circuit 90, a positive determination is made, and the imaging processing transitions to step S120.

In step S120, the CPU 52 acquires the still picture image data and executes various types of processing, and then, transitions to step S108. For example, "various types of processing" here include processing of outputting the still picture image data to the image processing portion 62. In a case where the still picture image data is output to the image processing portion 62, for example, the image processing portion 62 performs signal processing on the still picture image data and outputs the still picture image data subjected to the signal processing to an external apparatus (not illustrated) through the external I/F 63. For example, a memory card, a solid state drive (SSD), a universal serial bus (USB) memory, a personal computer (PC), and a server are illustrated as the "external apparatus" here.

In step S110 illustrated in FIG. 16, the CPU 52 finishes display of the live view image and then, finishes the imaging processing.

Figure 22:
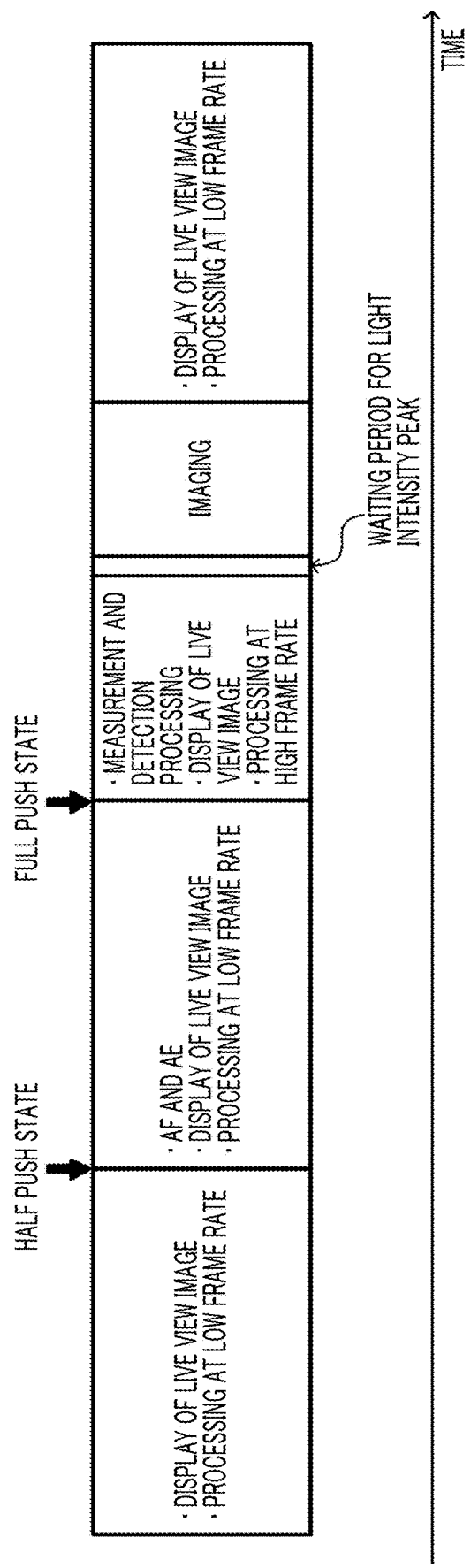
FIG. 22 is a time chart illustrating one example of sequential processing implemented by executing the imaging processing and the flicker avoidance imaging processing according to the embodiment.

In a case where the imaging processing illustrated in FIG. 16 and the flicker avoidance imaging processing illustrated in FIG. 17 are executed, for example, sequential processing illustrated in FIG. 22 is executed.

The sequential processing illustrated in FIG. 22 will be described. First, in a state where the release button 25 is not pushed, the live view image is displayed on the display apparatus, and the first processing is executed at the low frame rate in the processing circuit 94 of the imaging element 20.

In a case where the release button 25 is pushed to the half push state, the AF and the AE are executed. In addition, even in a case where the release button 25 is set to the half push state, the live view image is displayed on the display apparatus, and the first processing is executed at the low frame rate in the processing circuit 94 of the imaging element 20.

In a case where the release button 25 is set to the full push state, the measurement and detection processing is executed by the processing circuit 94 in addition to the first processing. The first processing and the measurement and detection processing are executed at the high frame rate decided in processing of step S156. In addition, even in a case where the release button 25 is set to the full push state, the screen of the display apparatus is not blacked out, and the live view image is displayed on the screen of the display apparatus.

In a case where the measurement and detection processing is finished, the imaging element 20 starts imaging after waiting for reaching of the light intensity peak. For example, waiting for reaching of the light intensity peak means waiting for a positive determination in step S174 of the flicker avoidance imaging processing illustrated in FIG. 17.

In a case where imaging by the imaging element 20 is finished, the live view image is displayed on the display apparatus, and the first processing is executed at the low frame rate in the processing circuit 94 of the imaging element 20.

As described above, the imaging apparatus 10 incorporates the processing circuit 94 and the memory 96. In the imaging apparatus 10, the subject is imaged at the first frame rate, and the captured image data obtained by imaging is stored in the memory 96. In addition, processing based on the captured image data stored in the memory 96 is performed by the image processing circuit 94C. The output image data based on the captured image data is output to the rear stage circuit 90 at the second frame rate by the output circuit 94D. The first frame rate is determined in accordance with the flicker occurrence cycle, and the flicker effect avoidance timing is detected by the processing circuit 94 based on the captured image data of the plurality of frames. Accordingly, in the imaging apparatus 10, since imaging is performed at the flicker effect avoidance timing in accordance with the first frame rate determined in accordance with the flicker occurrence cycle, imaging that avoids the effect of the flicker is implemented.

In addition, in the imaging apparatus 10, the processing time period of the measurement and detection processing executed by the processing circuit 94 is determined in accordance with the flicker occurrence cycle. Accordingly, the imaging apparatus 10 can accurately determine the processing time period required for the measurement and detection processing, compared to a case of not using the brightness difference between the frames of the captured image data.

In addition, in the imaging apparatus 10, the timing at which the brightness difference changes from a positive value to a negative value is set as the flicker effect avoidance timing. Accordingly, the imaging apparatus 10 can detect a timing at which the captured image is brightest as the flicker effect avoidance timing.

In addition, in the imaging apparatus 10, the measurement and detection processing is stopped on a condition that the brightness difference changes from a positive value to a negative value twice. Accordingly, the imaging apparatus 10 can set the processing time period required for the measurement and detection processing to a minimum necessary time period.

In addition, in the imaging apparatus 10, the first frame rate is set to a frame rate lower than the frame rate in the measurement and detection processing during a period until a positive determination is made in step S180 included in the flicker avoidance imaging processing after the measurement and detection processing is performed. Accordingly, the imaging apparatus 10 can reduce electric power consumption, compared to a case where the frame rate in the measurement and detection processing is also applied to processing other than the measurement and detection processing.

In addition, in the imaging apparatus 10, in a case where a positive determination is made in step S180 included in the flicker avoidance imaging processing, execution of the measurement and detection processing is resumed by the processing circuit 94. Accordingly, the imaging apparatus 10 can reduce electric power consumption, compared to a case where the measurement and detection processing is executed at all times.

In addition, in the imaging apparatus 10, in a case where a positive determination is made in step S180 included in the flicker avoidance imaging processing and a positive determination is made in step S188, execution of the measurement and detection processing is resumed. Accordingly, the imaging apparatus 10 can avoid unnecessary execution of the measurement and detection processing.

In addition, in the imaging apparatus 10, imaging is performed in a case where the brightness of the captured image is at the peak (steps S174 and S176). Accordingly, the imaging apparatus 10 can obtain a bright captured image, compared to a case where imaging is performed at a timing different from a timing at which the brightness of the captured image reaches the peak.

In addition, in the imaging apparatus 10, the output image data obtained by imaging at the timing of the light intensity peak is output to the rear stage circuit 90 from the output circuit 94D. Accordingly, the imaging apparatus 10 can output the output image data that avoids the effect of the flicker.

In addition, in the imaging apparatus 10, the display control portion performs a control for displaying an image based on the output image data on the display apparatus. Accordingly, the imaging apparatus 10 can display an image that avoids the effect of the flicker on the display apparatus.

In addition, in the imaging apparatus 10, imaging is performed in the crop region that is the imaging region selected in accordance with the crop coefficient determined in accordance with the flicker effect avoidance timing. Accordingly, the imaging apparatus 10 can suppress capturing of the line flicker in the image, compared to a case where imaging is performed in the entire imaging region of the photoelectric conversion element 92.

In addition, in the imaging apparatus 10, the flicker occurrence cycle is predetermined as the occurrence cycle of the flicker caused by the flickering light source that flickers by being supplied with alternating current electric power from the commercial power source. Accordingly, the imaging apparatus 10 can reduce an effort of determining the flicker occurrence cycle, compared to a case where the flicker occurrence cycle is not predetermined.

In addition, in the imaging apparatus 10, in a case where the frequency indicated by the power source frequency information is 50 Hz, 10 ms is calculated as the flicker occurrence cycle. In a case where the frequency indicated by the power source frequency information is 60 Hz, 8.33 ms is calculated as the flicker occurrence cycle. In a case where the flicker occurrence cycle is 10 ms, the high frame rate of the first frame rate is decided to be the first high frame rate out of the first high frame rate and the second high frame rate. In a case where the flicker occurrence cycle is 8.33 ms, the high frame rate of the first frame rate is decided to be the second high frame rate out of the first high frame rate and the second high frame rate. That is, the first frame rate is increased as the flicker occurrence cycle is shortened. Accordingly, the imaging apparatus 10 can increase the detection accuracy of the flicker effect avoidance timing, compared to a case where the first frame rate is fixed.

In addition, in the imaging apparatus 10, the captured image data is image data obtained by imaging the subject using the rolling shutter method. Accordingly, the imaging apparatus 10 can avoid the effect of the flicker that occurs in a case where the subject is imaged using the rolling shutter method.

Furthermore, in the imaging apparatus 10, the laminated imaging element in which the photoelectric conversion element 92 is laminated with the processing circuit 94 and the memory 96 is employed as the imaging element 20. Accordingly, the imaging apparatus 10 can increase the detection accuracy of the flicker effect avoidance timing, compared to a case of using an imaging element of a type in which the photoelectric conversion element 92 is not laminated with a storage portion.

Figure 24:
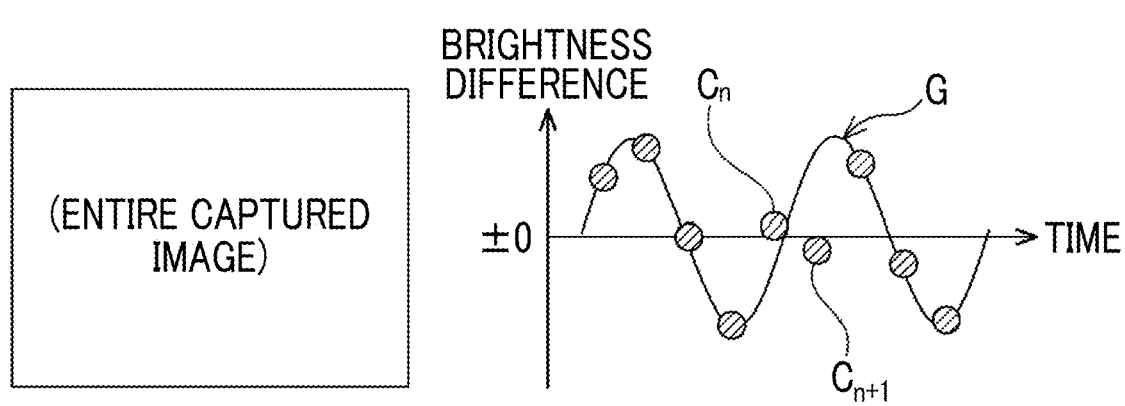
FIG. 24 is a conceptual diagram illustrating a plot example of a brightness difference in a case where the brightness difference calculated from the entire one frame is affected by a motion of the subject and/or a camera shake.

In the embodiment, a difference between the average brightness of the entire captured image of one frame of adjacent frames and the average brightness of the entire captured image of the other frame is illustrated as the brightness difference. However, the technology of the present disclosure is not limited thereto. In a case where the entire captured image of one frame is used as a calculation target of the brightness difference, the brightness of the entire captured image may significantly change between the frames due to an effect of the motion of the subject and/or the camera shake on calculation accuracy of the brightness difference. For example, as illustrated in FIG. 24, a brightness difference $C_n$ and a brightness difference $C_{n+1}$ are affected by the motion of the subject and/or the camera shake. In this case, the accuracy of the brightness difference cycle characteristic graph G is decreased, and accordingly, the detection accuracy of the flicker effect avoidance timing may also be decreased.

Figure 25:
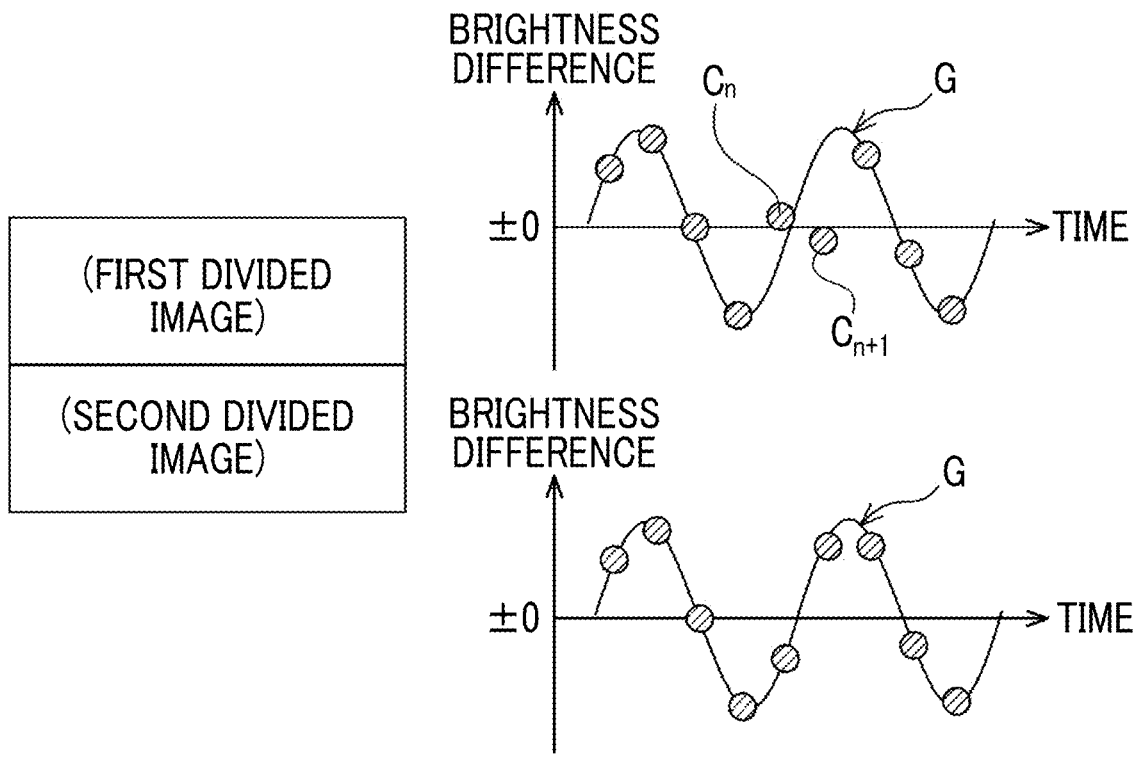
FIG. 25 is a conceptual diagram illustrating a plot example of a brightness difference in a case where the brightness difference calculated from a first divided image (divided image on an upper side) obtained by dividing each of captured images of two frames into two parts in a vertical direction is affected by the motion of the subject and/or the camera shake, and a plot example of a brightness difference in a case where the brightness difference calculated from a second divided image (divided image on a lower side) obtained by dividing each of the captured images of two frames into two parts in the vertical direction is affected by the motion of the subject and/or the camera shake.

In order to reduce the effect of the motion of the subject and/or the camera shake, the brightness difference between corresponding partial regions between the frames of the captured image data may be calculated. For example, as illustrated in FIG. 25, the captured image of one frame is divided into two divided images of first and second divided images by dividing the captured image into two parts in the vertical direction. The brightness difference between the divided images at corresponding positions is calculated between the adjacent frames. The brightness difference between the divided images may be employed from any of the first and second divided images that is less affected by the motion of the subject and/or the camera shake. In the example illustrated in FIG. 25, the brightness difference of the second divided image is less affected by the motion of the subject and/or the camera shake than the brightness difference of the first divided image. Thus, the brightness difference of the second divided image may be employed.

In addition, the number of divisions of the captured image may be greater than or equal to three. The captured image may be divided in the horizontal direction instead of the vertical direction. The captured image may be not only divided in the vertical direction but also divided in the horizontal direction. In such a manner, increasing the number of divided images is effective in a case where a factor that affects the calculation accuracy of the brightness difference is present in addition to the motion of the subject and/or the camera shake. For example, in a case where imaging is performed in an environment in which an extremely bright light source is present, pixel signal are saturated, and it is difficult to calculate the brightness difference between the frames. Thus, an area as the calculation target can be secured by increasing the number of divided images.

In addition, while a case where the brightness difference between the adjacent frames is calculated is described in the embodiment, the technology of the present disclosure is not limited thereto. For example, since the captured image data of the plurality of frames is stored in the memory 96, the brightness difference between the brightness of the most recent captured image data and the brightness of the captured image data obtained by imaging after two or more frames from the most recent captured image data may be calculated. In the example illustrated in FIG. 11, the brightness difference between the first frame and the third frame of the captured image data may be calculated instead of the brightness difference between the first frame and the second frame of the captured image data. In this case, the captured image data of the first frame is one example of "first captured image data" according to the embodiment of the technology of the present disclosure, and the captured image data of the third frame is one example of "second captured image data" according to the embodiment of the technology of the present disclosure.

Even in a case of calculating the brightness difference between the brightness of the most recent captured image data and the brightness of the captured image data obtained by imaging after two or more frames from the most recent captured image data, the processing time period of the measurement and detection processing is calculated as a time period required for the brightness difference to change from a positive value to a negative value at least twice, in the same manner as the embodiment.

In addition, while the crop coefficient derivation table 98 is illustrated in the embodiment, the technology of the present disclosure is not limited thereto. For example, the crop coefficient may be calculated using a crop coefficient derivation calculation expression that takes the light intensity peak cycle as an independent variable and takes the crop coefficient as a dependent variable.

In addition, while the line flicker is illustrated in the embodiment, the technology of the present disclosure is not limited thereto. The technology of the present disclosure can also be applied to a surface flicker that flickers in units of surfaces.

In addition, while the flickering light source that flickers in accordance with the frequency of the commercial power source is illustrated in the embodiment, the technology of the present disclosure can also be applied to a case where imaging is performed by the imaging apparatus 10 in an environment in which the flickering light source that flickers regardless of the frequency of the commercial power source flickers. In this case, in the flicker avoidance imaging processing illustrated in FIG. 17, step S152 is not necessary, and for example, processing of receiving the flicker occurrence cycle through the touch panel 42 and/or the operation portion 54 may be applied instead of processing of step S154.

In addition, while an example of a form in which the first frame rate is changed from the low frame rate to the high frame rate from the viewpoint of reducing electric power consumption is illustratively described in the embodiment, only the high frame rate may be set.

In addition, while a timing at which the first predetermined time period or the second predetermined time period elapses is illustrated as the brightness difference check timing in the embodiment, the technology of the present disclosure is not limited thereto. For example, the brightness difference check timing may be a timing at which an instruction to check the brightness difference is provided from the user through the touch panel 42 and/or the operation portion 54.

In addition, in the embodiment, a case where a positive determination is made in step S180 included in the flicker avoidance imaging processing, that is, a case where the brightness difference check timing is reached, is illustrated as one example of the "case where the predetermined condition is satisfied" according to the embodiment of the technology of the present disclosure. However, the technology of the present disclosure is not limited thereto. For example, in a case where a predetermined instruction as an instruction start executing processing from step S181 of the flicker avoidance imaging processing is received by the touch panel 42 and/or the operation portion 54, processing from step S181 of the flicker avoidance imaging processing may be executed. Alternatively, in a case where the number of times that the still picture imaging instruction is provided reaches a predetermined number (for example, 200) in a state where the power source of the imaging apparatus 10 is switched ON, processing from step S181 may be executed.

In addition, while an example of a form in which processing from step S164 is executed again on a condition that processing of steps S180 to S188 is executed is illustratively described in the embodiment, the technology of the present disclosure is not limited thereto. For example, processing from step S164 may be executed again at a timing at which the first predetermined time period elapses from previous execution of processing of step S168, or a timing at which the second predetermined time period elapses from switching ON of the power source of the imaging apparatus 10. Alternatively, in a case where a predetermined instruction as an instruction resume execution of processing from step S164 of the flicker avoidance imaging processing is received by the touch panel 42 and/or the operation portion 54, processing from step S164 of the flicker avoidance imaging processing may be executed again. Further alternatively, in a case where the number of times that the still picture imaging instruction is provided reaches the predetermined number in a state where the power source of the imaging apparatus 10 is switched ON, processing from step S164 may be executed.

In addition, while the processing circuit 94 implemented by the ASIC is illustrated in the embodiment, the flicker avoidance imaging processing may be implemented by a computer using a software configuration.

Figure 26:
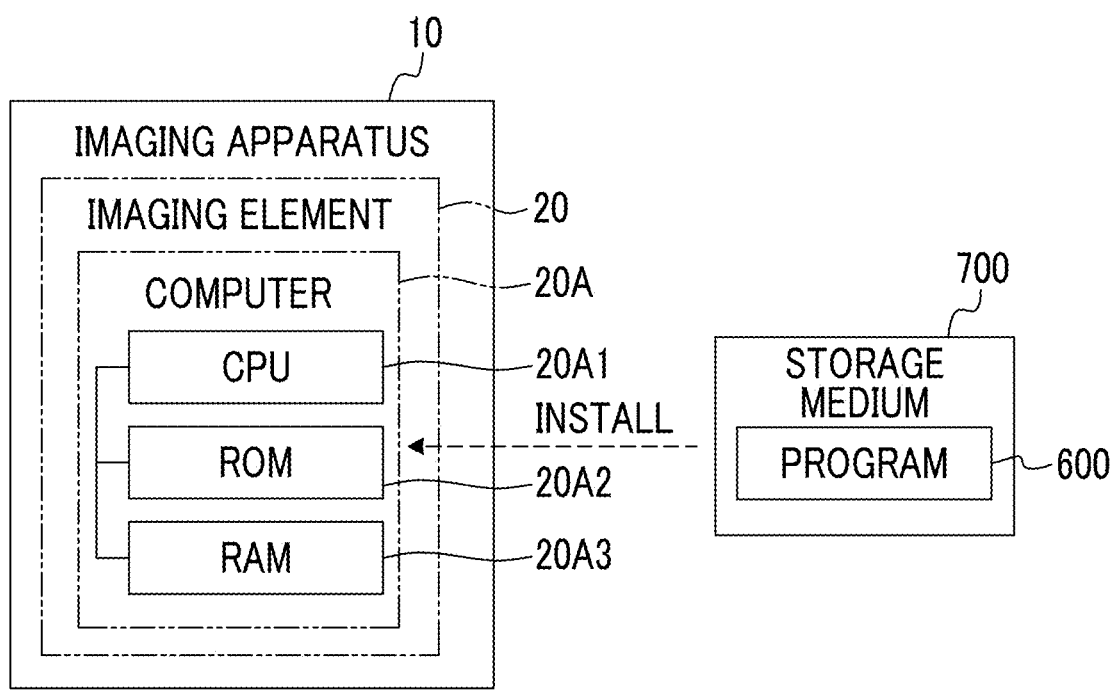
FIG. 26 is a conceptual diagram illustrating one example of an aspect where a program according to the embodiment is installed on the imaging element from a storage medium storing the program according to the embodiment.

In this case, for example, as illustrated in FIG. 26, a program 600 for causing a computer 20A incorporated in the imaging element 20 to execute the flicker avoidance imaging processing is stored in a storage medium 700. The computer 20A comprises a CPU 20A1, a ROM 20A2, and a RAM 20A3. The program 600 of the storage medium 700 is installed on the computer 20A, and the CPU 20A1 of the computer 20A executes the flicker avoidance imaging processing in accordance with the program 600. A single CPU is illustrated as the CPU 20A1. However, the technology of the present disclosure is not limited thereto, and a plurality of CPUs may be employed instead of the CPU 20A1. That is, the imaging processing and/or the flicker avoidance imaging processing may be executed by one processor or a plurality of physically separated processors.

Any portable storage medium such as an SSD or a USB memory is illustrated as one example of the storage medium 700.

Alternatively, the program 600 may be stored in a storage portion of another computer, a server apparatus, or the like connected to the computer 20A through a communication network (not illustrated), and the program 600 may be downloaded in accordance with a request from the imaging apparatus 10 or the like. In this case, the downloaded program 600 is executed by the computer 20A.

The computer 20A may be disposed on the outside of imaging element 20. In this case, the computer 20A may control the processing circuit 94 in accordance with the program 600.

Various processors illustrated below can be used as a hardware resource for executing various types of processing described in the embodiment. The imaging processing and the flicker avoidance imaging processing are illustrated as various types of processing described in the embodiment. For example, as described above, a CPU that is a general-purpose processor functioning as a hardware resource for executing various types of processing according to the embodiment of the technology of the present disclosure by executing software, that is, the program, is illustrated as a processor. Alternatively, a dedicated electric circuit such as an FPGA, a PLD, or an ASIC that is a processor having a circuit configuration dedicatedly designed to execute a specific type of processing is illustrated as a processor. A memory is incorporated in or connected to any of the processors, and any of the processors executes various types of processing using the memory.

The hardware resource for executing various types of processing according to the embodiment of the technology of the present disclosure may be configured with one of those various processors or may be configured with a combination of two or more processors of the same type or different types (for example, a combination of a plurality of FPGAs or a combination of a CPU and an FPGA). Alternatively, the hardware resource for executing various types of processing according to the embodiment of the technology of the present disclosure may be one processor.

As an example of a configuration with one processor, first, as represented by a computer such as a client and a server, a form in which one processor is configured with a combination of one or more CPUs and software and this processor functions as the hardware resource for executing various types of processing according to the embodiment of the technology of the present disclosure is available. Second, as represented by a system-on-a-chip (SoC) or the like, a form of using a processor that implements, by one IC chip, a function of the entire system including a plurality of hardware resources for executing various types of processing according to the embodiment of the technology of the present disclosure is available. In such a manner, various types of processing according to the embodiment of the technology of the present disclosure are implemented using one or more of above various processors as a hardware resource.

Furthermore, as a hardware structure of those various processors, more specifically, an electric circuit in which circuit elements such as semiconductor elements are combined can be used.

Figure 27:
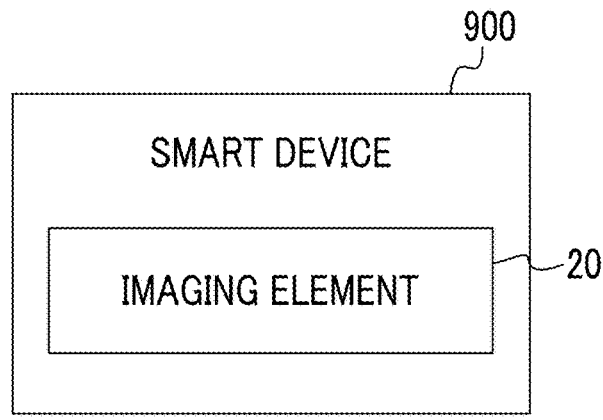
FIG. 27 is a block diagram illustrating one example of a schematic configuration of a smart device incorporating the imaging element according to the embodiment.

While an interchangeable lens camera is illustrated as the imaging apparatus 10 in the embodiment, the technology of the present disclosure is not limited thereto. For example, the technology of the present disclosure may be applied to a smart device 900 illustrated in FIG. 27. For example, the smart device 900 illustrated in FIG. 27 is one example of the imaging apparatus according to the embodiment of the technology of the present disclosure. The imaging element 20 described in the embodiment is mounted on the smart device 900. Even with the smart device 900 configured in such a manner, the same actions and effects as the imaging apparatus 10 described in the embodiment are achieved. The technology of the present disclosure can be applied to not only the smart device 900 but also a PC or a wearable terminal apparatus.

While the first display 40 and the second display 80 are illustrated as the display apparatus in the embodiment, the technology of the present disclosure is not limited thereto. For example, a separate display that is retrofit into the imaging apparatus main body 12 may be used as the "display portion" according to the embodiment of the technology of the present disclosure.

In addition, the imaging processing and the flicker avoidance imaging processing described in the embodiment are merely one example. Accordingly, unnecessary steps may be removed, new steps may be added, or a processing order may be changed without departing from a gist of the present disclosure.

Above described contents and illustrated contents are detailed description for parts according to the embodiment of the technology of the present disclosure and are merely one example of the technology of the present disclosure. For example, description related to the above configurations, functions, actions, and effects is description related to one example of configurations, functions, actions, and effects of the parts according to the embodiment of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards is specifically and individually indicated to be incorporated by reference.

What is claimed is:

1. An imaging element comprising:
a memory that stores captured image data obtained by imaging a subject at a first frame rate and that is incorporated in the imaging element;
a processing circuit that performs processing based on the captured image data stored in the memory and that is incorporated in the imaging element; and
an output circuit that outputs output image data based on the captured image data to an outside of the imaging element at a second frame rate and that is incorporated in the imaging element,
wherein the first frame rate is a frame rate that is higher than the second frame rate and is determined in accordance with an occurrence cycle of a flicker,
wherein the processing circuit detects a flicker effect avoidance timing at which an effect of the flicker on imaging by the imaging element is avoided, based on the captured image data of a plurality of frames,
wherein the processing performed by the processing circuit includes measurement and detection processing of measuring a brightness difference between frames of the captured image data and detecting the flicker effect avoidance timing based on the brightness difference, and
wherein a processing time period required for the measurement and detection processing is determined in accordance with the occurrence cycle of the flicker.

2. The imaging element according to claim 1,
wherein the captured image data is categorized into first captured image data and second captured image data obtained by imaging later than the first captured image data between the frames,
the brightness difference is a subtraction result of subtracting brightness of the second captured image data from brightness of the first captured image data, and
the flicker effect avoidance timing is a timing at which the brightness difference changes from a positive value to a negative value.

3. The imaging element according to claim 2,
wherein the processing circuit stops the measurement and detection processing on a condition that the brightness difference changes from the positive value to the negative value twice.

4. The imaging element according to claim 2,
wherein the second captured image data is image data obtained by imaging after two or more frames from the first captured image data.

5. The imaging element according to claim 1,
wherein the first frame rate is set to a frame rate lower than a frame rate in the measurement and detection processing during a period until a predetermined condition is satisfied after the measurement and detection processing is performed.

6. The imaging element according to claim 5,
wherein the processing circuit performs the measurement and detection processing again in a case where the predetermined condition is satisfied.

7. The imaging element according to claim 6,
wherein in a case where the predetermined condition is satisfied and the brightness difference measured by the processing circuit changes from the brightness difference measured in the processing time period, the measurement and detection processing is performed again.

8. The imaging element according to claim 1,
wherein the brightness difference is a brightness difference between partial regions that correspond to each other between the frames of the captured image data.

9. The imaging element according to claim 1,
wherein the flicker effect avoidance timing is a timing at which brightness of an image indicated by the captured image data reaches a peak.

10. The imaging element according to claim 1,
wherein the output image data is image data based on the captured image data obtained by imaging at the flicker effect avoidance timing.

11. The imaging element according to claim 1,
wherein the occurrence cycle is predetermined as an occurrence cycle of a flicker occurring due to a light source that flickers by being supplied with alternating current electric power from a commercial power source.

12. The imaging element according to claim 1,
wherein the first frame rate is increased as the occurrence cycle is shortened.

13. The imaging element according to claim 1,
wherein the captured image data is image data obtained by imaging the subject using a rolling shutter method.

14. The imaging element according to claim 1,
wherein the imaging element is a laminated imaging element that includes a photoelectric conversion element and in which the photoelectric conversion element is laminated with the memory.

15. The imaging element according to claim 1,
wherein the captured image data is image data indicating a plurality of divided images obtained by dividing the captured image, and
the processing circuit measures, between the adjacent frames, a brightness difference between the plurality of divided images at corresponding positions, and detects the flicker effect avoidance timing, based on the brightness difference between the plurality of divided images.

16. The imaging element according to claim 1, wherein:
the captured image data is image data indicating a plurality of divided images obtained by dividing the captured image,
the processing circuit measures, between the adjacent frames, a brightness difference between the plurality of divided images at corresponding positions, and detects the flicker effect avoidance timing, based on the brightness difference between the plurality of divided images, and
the brightness difference between the plurality of divided images, employed for detecting the flicker effect avoidance timing, is a brightness difference between the divided images that are least affected by motion of the subject, camera shake, or a combination thereof, among the plurality of divided images.

17. An imaging apparatus comprising:
the imaging element according to claim 1; and
a display processor that performs a control for displaying, on a display, an image based on the output image data output by the output circuit included in the imaging element.

18. An imaging element, comprising:
a memory that stores captured image data obtained by imaging a subject at a first frame rate and that is incorporated in the imaging element;
a processing circuit that performs processing based on the captured image data stored in the memory and that is incorporated in the imaging element; and
an output circuit that outputs output image data based on the captured image data to an outside of the imaging element at a second frame rate and that is incorporated in the imaging element,
wherein the first frame rate is a frame rate that is higher than the second frame rate and is determined in accordance with an occurrence cycle of a flicker,
wherein the processing circuit detects a flicker effect avoidance timing at which an effect of the flicker on imaging by the imaging element is avoided, based on the captured image data of a plurality of frames,
wherein the flicker is a line flicker, and
the subject is imaged in an imaging region that is selected in accordance with a crop coefficient determined in accordance with the flicker effect avoidance timing.

19. An image data processing method of an imaging element incorporating a memory that stores captured image data obtained by imaging a subject at a first frame rate, a processing circuit that performs processing based on the captured image data stored in the memory, and an output circuit that outputs output image data based on the captured image data to an outside at a second frame rate, the image data processing method comprising:
setting the first frame rate to a frame rate higher than the second frame rate and determining the first frame rate in accordance with an occurrence cycle of a flicker; and
detecting a flicker effect avoidance timing at which an effect of the flicker on imaging by the imaging element is avoided, by the processing circuit based on the captured image data of a plurality of frames, measuring a brightness difference between frames of the captured image data and detecting the flicker effect avoidance timing based on the brightness difference, and wherein a processing time period required for measuring the brightness difference and detecting the flicker effect avoidance timing is determined in accordance with the occurrence cycle of the flicker.

20. A non-transitory computer-readable storage medium storing a program causing a computer to function as a processing circuit and an output circuit included in an imaging element incorporating a memory that stores captured image data obtained by imaging a subject at a first frame rate, the processing circuit that performs processing based on the captured image data stored in the memory, and the output circuit that outputs output image data based on the captured image data to an outside at a second frame rate, wherein the first frame rate is a frame rate higher than the second frame rate and is determined in accordance with an occurrence cycle of a flicker, wherein the processing circuit detects a flicker effect avoidance timing at which an effect of the flicker on imaging by the imaging element is avoided, based on the captured image data of a plurality of frames, wherein the processing performed by the processing circuit includes measurement and detection processing of measuring a brightness difference between frames of the captured image data and detecting the flicker effect avoidance timing based on the brightness difference, and wherein a processing time period required for the measurement and detection processing is determined in accordance with the occurrence cycle of the flicker.

* * * * *